(12) United States Patent
Bonner et al.

(10) Patent No.: US 9,703,179 B2
(45) Date of Patent: Jul. 11, 2017

(54) DISPLAY SHELF MODULES WITH PROJECTORS FOR DISPLAYING PRODUCT INFORMATION AND MODULAR SHELVING SYSTEMS COMPRISING THE SAME

(71) Applicant: Sunrise R&D Holdings, LLC, Cincinnati, OH (US)

(72) Inventors: Brett Bracewell Bonner, New Richmond, OH (US); Titus Arthur Jones, Hebron, KY (US); Thomas Gonsiorowski, Arlington, MA (US); Torsten Volker Platz, Cambridge, MA (US)

(73) Assignee: Sunrise R&D Holdings, LLC, Cincinnati, OH (US)

( * ) Notice: Subject to any disclaimer, the term of this patent is extended or adjusted under 35 U.S.C. 154(b) by 626 days.

(21) Appl. No.: 13/734,443

(22) Filed: Jan. 4, 2013

(65) Prior Publication Data
US 2013/0176398 A1 Jul. 11, 2013

Related U.S. Application Data

(60) Provisional application No. 61/583,818, filed on Jan. 6, 2012.

(51) Int. Cl.
*G09F 19/18* (2006.01)
*G09F 15/00* (2006.01)
(Continued)

(52) U.S. Cl.
CPC .............. *G03B 21/10* (2013.01); *A47F 11/06* (2013.01); *G06F 3/01* (2013.01); *G06F 17/3028* (2013.01);
(Continued)

(58) Field of Classification Search
CPC ...................................................... G03B 21/12
(Continued)

(56) References Cited

U.S. PATENT DOCUMENTS

| 4,500,880 A | 2/1985 | Gomersall et al. |
| 4,750,151 A | 6/1988 | Baus |

(Continued)

FOREIGN PATENT DOCUMENTS

| DE | 29515221 U1 | 11/1995 | | |
| EP | 0105577 A1 * | 4/1984 | ............... | A47F 5/08 |

(Continued)

OTHER PUBLICATIONS

Notification of Transmittal of the International Search Report and the Written Opinion of the International Searching Authority of PCT/US2013/020306 issued by the European Patent Office on Apr. 24, 2013.

(Continued)

*Primary Examiner* — Mikhail Itskovich
(74) *Attorney, Agent, or Firm* — Dinsmore & Shohl LLP

(57) ABSTRACT

Modular shelving systems and display shelves for modular shelving systems are disclosed. In one embodiment, a modular shelving system includes a shelf support frame comprising a back plane portion and a base portion. At least one display shelf module is removably coupled to the back plane portion of the shelf support frame such that the display shelf module is vertically and horizontally positionable on the back plane portion of the shelf support frame. The display shelf module may include a top and bottom panels, and side panels that define an interior volume. A display panel may be affixed to a front of the display shelf module. A projector may be disposed in the interior volume of the display shelf module. The projector projects an optical signal onto a rear (Continued)

surface of the display panel such that image data is visible on a front surface of the display panel.

24 Claims, 15 Drawing Sheets

(51) Int. Cl.
| | |
|---|---|
| *G03B 21/10* | (2006.01) |
| *G06F 3/01* | (2006.01) |
| *G06F 17/30* | (2006.01) |
| *H04N 13/02* | (2006.01) |
| *A47F 11/06* | (2006.01) |
| *A47F 5/10* | (2006.01) |

(52) U.S. Cl.
CPC .............. *G09F 15/00* (2013.01); *G09F 19/18* (2013.01); *H04N 13/0203* (2013.01); *A47F 5/103* (2013.01)

(58) Field of Classification Search
USPC .......................................................... 348/61
See application file for complete search history.

(56) References Cited

U.S. PATENT DOCUMENTS

| | | | |
|---|---|---|---|
| 4,885,878 A * | 12/1989 | Wuu | ................................... 52/6 |
| 5,448,226 A | 9/1995 | Failing, Jr. et al. | |
| 5,572,653 A | 11/1996 | DeTemple et al. | |
| 5,694,142 A | 12/1997 | Dumoulin et al. | |
| 5,898,383 A | 4/1999 | Forsythe | |
| 6,011,487 A | 1/2000 | Plocher | |
| 6,105,004 A | 8/2000 | Halperin et al. | |
| 6,424,998 B2 | 7/2002 | Hunter | |
| 6,430,603 B2 | 8/2002 | Hunter | |
| 6,430,605 B2 | 8/2002 | Hunter | |
| 6,464,142 B1 | 10/2002 | Denenberg et al. | |
| 6,870,670 B2 | 3/2005 | Gehring et al. | |
| 6,874,684 B1 | 4/2005 | Denenberg et al. | |
| 6,948,820 B2 | 9/2005 | Veligdan et al. | |
| 6,995,906 B2 * | 2/2006 | Edney | ........................... 359/450 |
| 7,057,578 B2 | 6/2006 | Yaniv | |
| 7,093,755 B2 | 8/2006 | Jordan et al. | |
| 7,286,101 B2 | 10/2007 | Hosaka | |
| 7,286,111 B2 | 10/2007 | Stephenson, III | |
| 7,287,001 B1 | 10/2007 | Falls et al. | |
| 7,369,047 B2 | 5/2008 | Broad et al. | |
| 7,410,098 B2 | 8/2008 | Denenberg et al. | |
| 7,537,155 B2 | 5/2009 | Denenberg et al. | |
| 7,564,349 B2 | 7/2009 | Robey | |
| 7,696,897 B2 * | 4/2010 | Horii et al. | ................. 340/815.4 |
| 7,778,942 B2 | 8/2010 | Naito | |
| 7,792,711 B2 | 9/2010 | Swafford, Jr. et al. | |
| 7,798,652 B2 | 9/2010 | Ikeda et al. | |
| 7,830,259 B2 | 11/2010 | Walker et al. | |
| 7,832,874 B2 | 11/2010 | Ikeda et al. | |
| 7,834,819 B2 | 11/2010 | Dunn et al. | |
| 7,948,448 B2 | 5/2011 | Hutchinson et al. | |
| 7,954,958 B2 | 6/2011 | Ikeda et al. | |
| 7,954,959 B2 | 6/2011 | Ikeda et al. | |
| 7,997,734 B2 | 8/2011 | Mochizuki et al. | |
| 2002/0163720 A1 | 11/2002 | Piepel et al. | |
| 2005/0116821 A1 | 6/2005 | Wilsey et al. | |
| 2005/0155070 A1 | 7/2005 | Slaughter | |
| 2006/0232981 A1 | 10/2006 | Pfund et al. | |
| 2007/0229222 A1 | 10/2007 | Leeds | |
| 2007/0287413 A1 * | 12/2007 | Kleitsch et al. | .............. 455/405 |
| 2008/0151197 A1 | 6/2008 | Mochizuki et al. | |
| 2008/0204672 A1 | 8/2008 | Ikeda et al. | |
| 2009/0059175 A1 | 3/2009 | Le Quesne et al. | |
| 2009/0108991 A1 | 4/2009 | Chadbourne et al. | |
| 2010/0014592 A1 | 1/2010 | Yoshimatsu et al. | |
| 2010/0102930 A1 | 4/2010 | McCoy | |
| 2010/0138322 A1 | 6/2010 | Nakamura | |
| 2010/0169186 A1 | 7/2010 | Sakaguchi et al. | |
| 2010/0169196 A1 | 7/2010 | De Luca | |
| 2010/0225444 A1 | 9/2010 | Nobutsugu et al. | |
| 2010/0328615 A1 | 12/2010 | Ikeda et al. | |
| 2011/0019162 A1 | 1/2011 | Huebner | |
| 2011/0102144 A1 | 5/2011 | Okina et al. | |
| 2011/0102750 A1 | 5/2011 | Ikeda et al. | |
| 2011/0199585 A1 | 8/2011 | Ikeda et al. | |
| 2011/0204009 A1 | 8/2011 | Karan | |
| 2011/0205500 A1 | 8/2011 | Ikeda et al. | |

FOREIGN PATENT DOCUMENTS

| | | |
|---|---|---|
| EP | 1839536 A2 | 10/2007 |
| JP | 2009160020 A | 7/2009 |
| WO | 02/054918 | 7/2002 |
| WO | 2005/086047 | 9/2005 |
| WO | 2009/009403 | 1/2009 |

OTHER PUBLICATIONS

CDS, Crystal Display Systems, The Clear Choice for Display Solutions, Revolutionary Shelf Edge Displays from in the UK, http://crystal-display.com/digital-signage/shelf-edge-displays/, First Accessed Oct. 18, 2011.

EP Office Action dated Oct. 13, 2015 relating to European Patent Application No. 13702111.9.

CA Office Action dated May 2, 2016 relating to Canadian Patent Application No. 2,860,700.

* cited by examiner

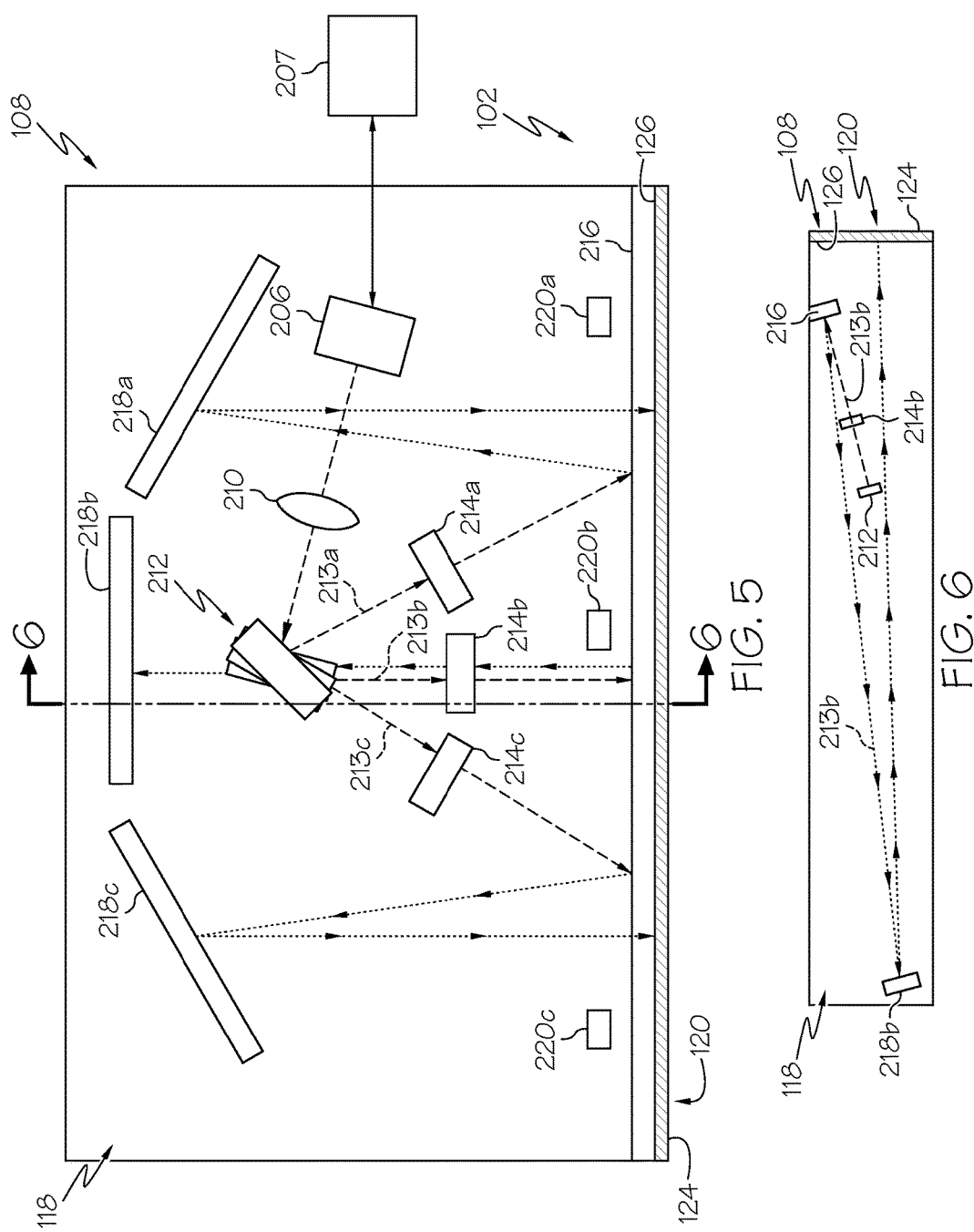

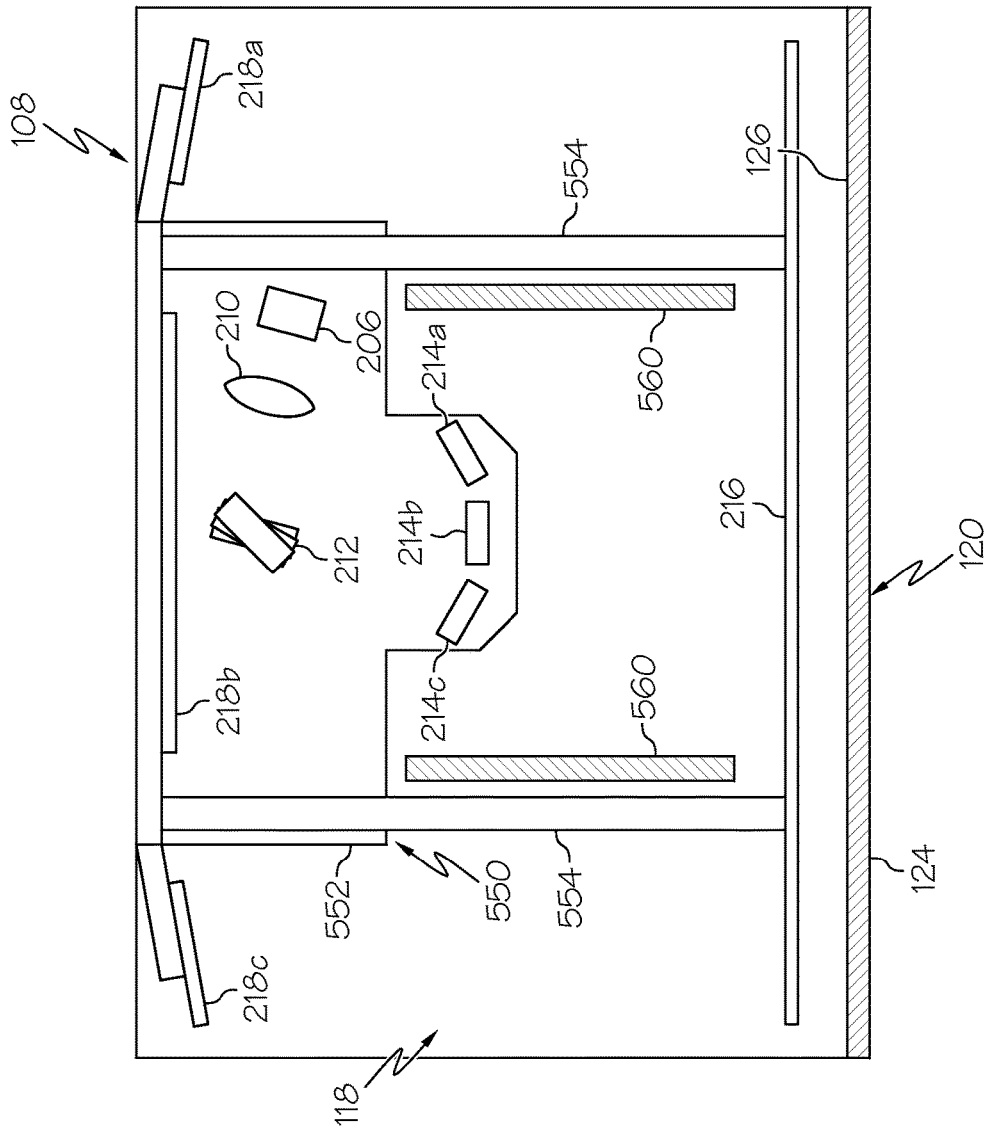

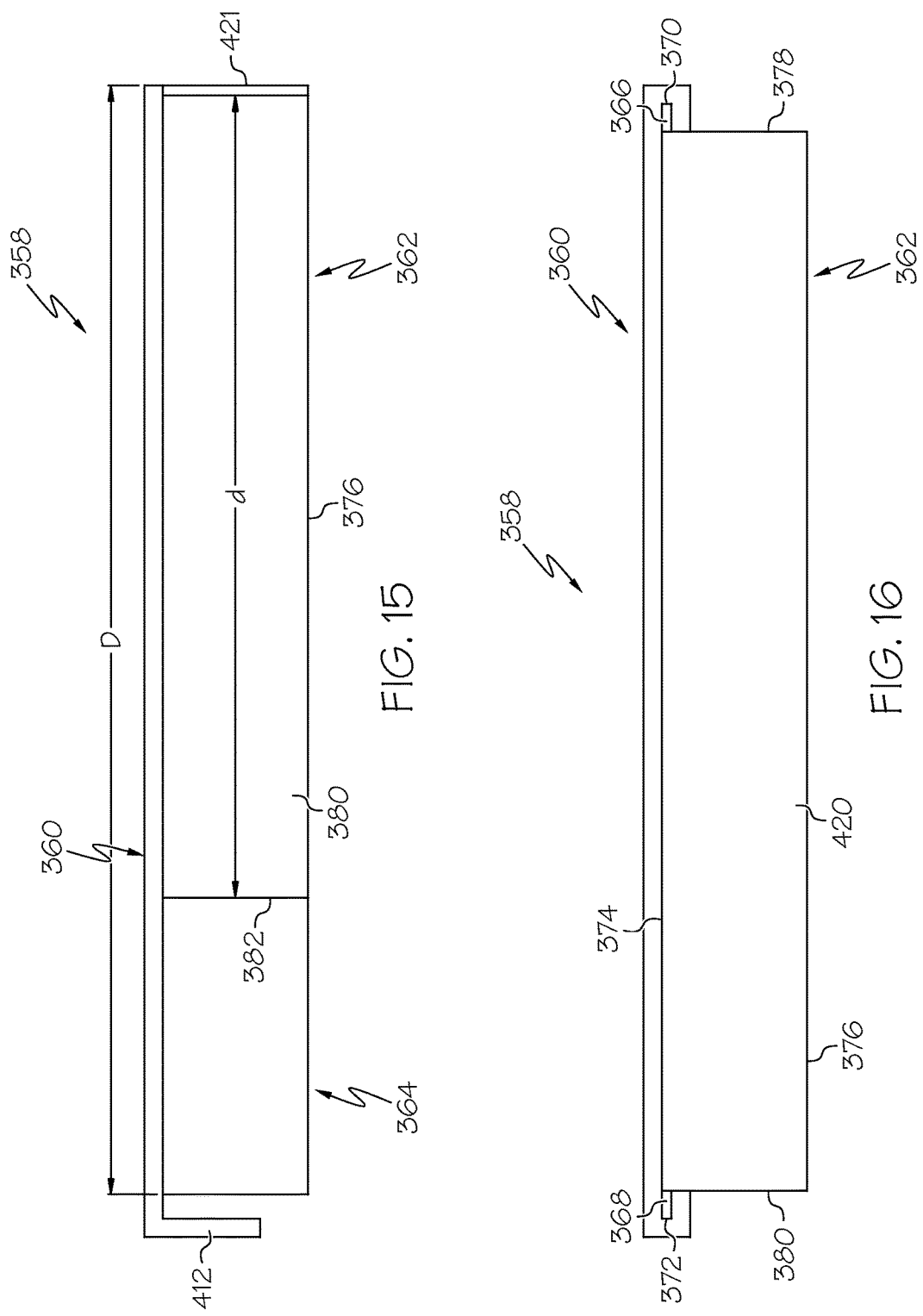

DISPLAY SHELF MODULES WITH PROJECTORS FOR DISPLAYING PRODUCT INFORMATION AND MODULAR SHELVING SYSTEMS COMPRISING THE SAME

CROSS REFERENCE TO RELATED APPLICATIONS

The present specification claims priority to U.S. Provisional Patent Application Ser. No. 61/583,818 filed Jan. 6, 2012 and entitled "DISPLAY SHELF MODULES WITH PROJECTORS FOR DISPLAYING PRODUCT INFORMATION AND MODULAR SHELVING SYSTEMS COMPRISING THE SAME," the entirety of which is incorporated by reference herein.

TECHNICAL FIELD

The present specification generally relates to display shelves for displaying products and, more specifically, to display shelf modules with projectors for displaying product information and modular shelving systems comprising the same.

BACKGROUND

Products are generally displayed on shelves at the point of purchase. The front edge of the shelf often includes a paper tag or similar signage which conveys information about the products displayed on the shelf, such as unit price, product size, discounts, manufacturer information, or the like. These tags are generally replaced with new paper tags or signage to update the information contained thereon. Replacement of these tags is a time consuming and laborious process.

Electronic tags have been proposed as a replacement for paper tags. These electronic tags may include LED or LCD displays which are affixed to the front edge of a shelf unit. The tags may be individually programmed to display product information corresponding to the products displayed on the shelf. However, such displays are expensive and susceptible to damage leading to failure of the display. Moreover, such displays may require independent power supplies which make readjusting the spacing between vertically and horizontally adjacent shelves a difficult task as the power supplies have to be independently rerouted.

Accordingly, a need exists for alternative display shelf modules for displaying product information and modular shelving systems incorporating the same.

SUMMARY

In one embodiment, a modular shelving system for displaying products includes a shelf support frame with a back plane portion and a base portion. At least one display shelf module may be removably coupled to the back plane portion of the shelf support frame such that the display shelf module is vertically positionable on the back plane portion of the shelf support frame. The display shelf module includes a top panel, an optional bottom panel and side panels. The top panel, optional bottom panel and side panels define an interior volume. A display panel may be affixed to a front of the display shelf module. A projector may be disposed in the interior volume of the display shelf module. The projector projects an optical signal onto a rear surface of the display panel such that image data is visible on a front surface of the image display panel.

In another embodiment, a display shelf module for use with a modular shelving system for displaying consumer goods may include a top panel, an optional bottom panel and side panels. The top panel, optional bottom panel and side panels define an interior volume of the display shelf module. At least one mounting clip may extend from a posterior end of the at least one display shelf module. The at least one mounting clip may engage with a corresponding mounting aperture of a back plane portion of a shelf support frame. A display panel may be affixed to a front of the display shelf module. A projector may be disposed in the interior volume of the display shelf module, the projector projecting an optical signal onto a rear surface of the display panel such that image data is visible on a front surface of the image display panel. An optical path from the projector to the rear surface of the display panel is substantially horizontal. The display shelf module may be removably coupled to the back plane portion of a shelf support frame such that the display shelf module is vertically positionable on the back plane portion of the shelf support plane.

In yet another embodiment, a display shelf module may include a shelf portion having a top panel and at least one mounting clip for mounting the shelf portion to a back plane portion of a modular shelving system. A detachable projector unit may be removably coupled to the shelf portion and includes a display panel affixed to a front of the detachable projector unit and at least one projector disposed in an interior volume of the detachable projector unit. The at least one projector may project an optical signal onto a back surface of the display panel such that image data is visible on a front surface of the display panel.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 5 schematically depicts the projector and various optical and electrical components positioned in the interior volume of the display shelf module of FIG. 3;

FIG. 6 schematically depicts a cross section of the display shelf module of FIG. 5 illustrating the optical path from the image divider to the back side of the display panel, according to one or more embodiments shown and described herein;

FIGS. 13A and 13B schematically depict one embodiment of a display shelf module in which the optical components are positioned on a floating frame;

FIG. 15 schematically depicts a side view of a display shelf module with a projector unit; and FIG. 16 schematically depicts a front view of a display shelf module with a detachable projector unit.

DETAILED DESCRIPTION

Figure 1:
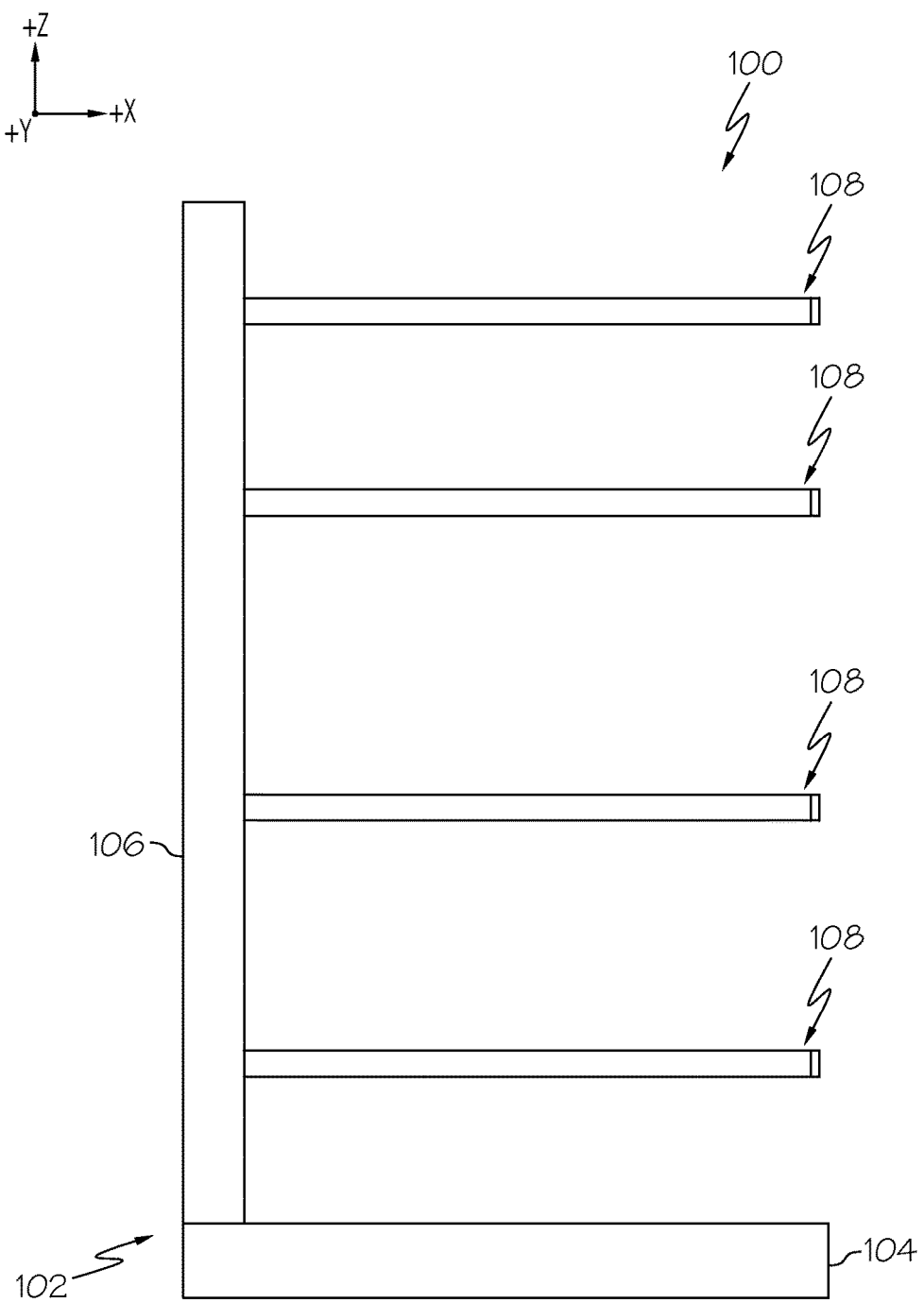
FIG. 1 schematically depicts a cross section of a modular shelving system according to one or more embodiments shown and described herein.

FIGS. 1 and 5 generally depict a modular shelving system for displaying consumer goods and a display shelf module for use with the same. The modular shelving system generally includes a shelf support frame with a back plane portion and a base portion. At least one display shelf module may be removably coupled to the back plane portion of the shelf support frame such that the display shelf module is vertically positionable on the back plane portion of the shelf support frame. The display shelf module includes a top panel, an optional bottom panel and side panels. The top panel, optional bottom panel and side panels define an interior volume in which a projector is positioned. A display panel may be affixed to a front of the display shelf module. The projector projects an optical signal onto a back surface of the display panel such that image data is visible on a front surface of the image display panel. Embodiments of the modular shelving system and display shelf modules for use in conjunction with the modular shelving system will be described in more detail herein with reference to the attached figures.

Referring now to FIG. 1, a cross section of a modular shelving system 100 is schematically depicted. The modular shelving system 100 generally includes a shelf support frame 102 having a base portion 104 and a back plane portion 106. The base portion 104 has a generally planar configuration, as depicted in FIG. 1, and supports the back plane portion 106. The back plane portion 106 extends from the base portion 104 in a substantially vertical direction (i.e., the +Z direction of the coordinate axes depicted in FIG. 1). The base portion 104 and the back plane portion 106 are generally formed from metallic materials such as steel, aluminum alloys, or any other material suitable for load-bearing applications. The base portion 104 and the back plane portion 106 may be constructed as a single unitary piece, such as when the base portion and the back plane portion 106 are joined by welding or the like. Alternatively, the base portion 104 and the back plane portion 106 may be formed as independent pieces and joined together with mechanical fasteners, such as screws, bolts or the like.

Figure 2:
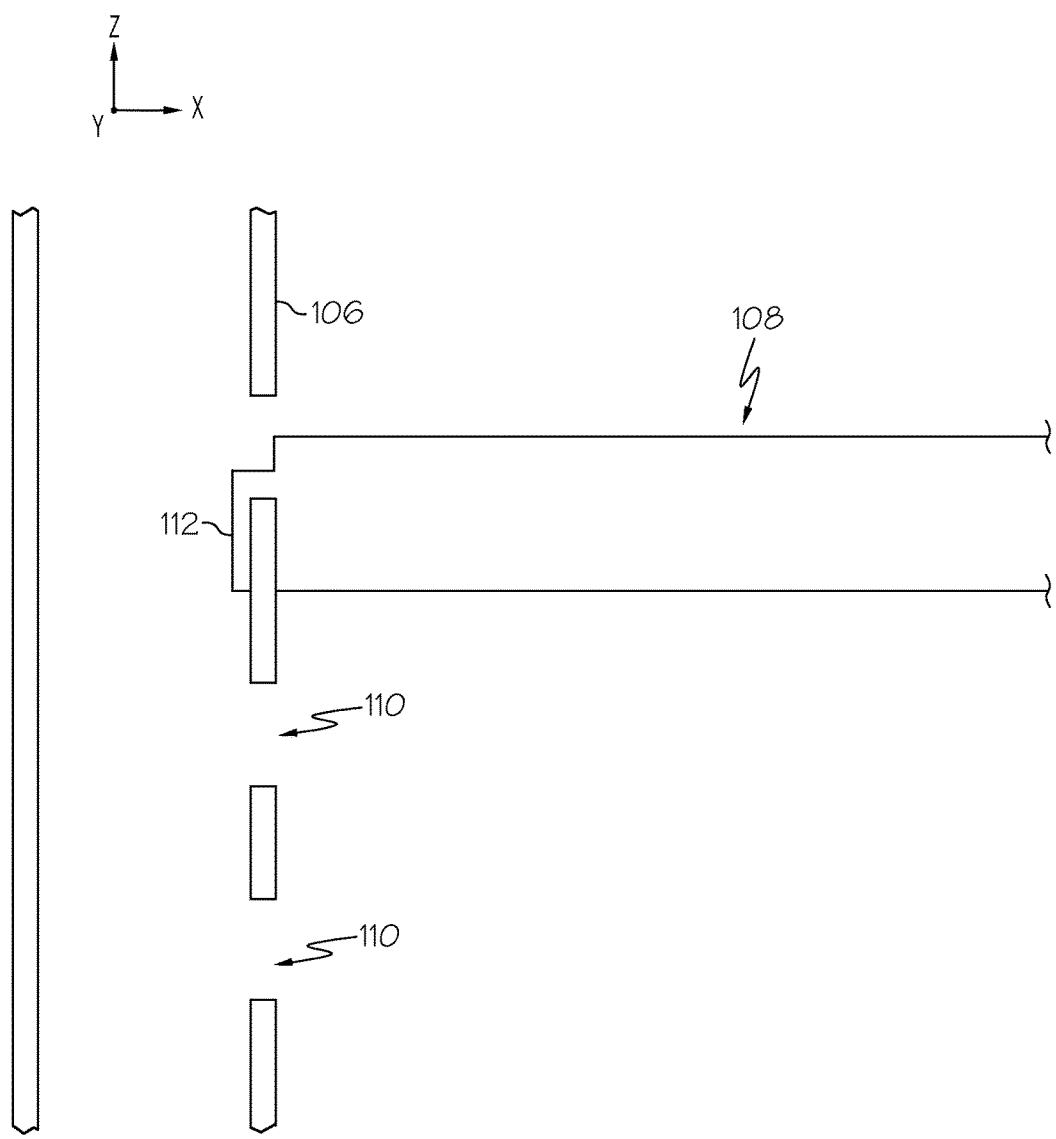
FIG. 2 schematically depicts a partial cross section of a modular shelving system illustrating the interconnectivity between a modular display shelf and the back plane portion of the shelf support plane, according to one or more embodiments shown and described herein.

Referring now to FIGS. 1 and 2, the modular shelving system 100 also includes one or more display shelf modules 108 which are removably coupled to the shelf support frame 102 such that the vertical and/or horizontal spacing between adjacent shelves is adjustable. For example, in the embodiments described herein, the display shelf modules 108 are removably coupled to the back plane portion 106 of the shelf support frame 102. Specifically, the back plane portion 106 of the shelf support frame 102 is formed with a plurality of mounting apertures 110. The mounting apertures 110 are arrayed over the surface of the back plane portion 106 at regular intervals in the Y and Z directions to facilitate adjustably supporting one or more display shelf modules 108 on the back plane portion 106. Each display shelf module 108 includes one or more mounting clips 112 extending from the posterior end of the display shelf module 108. To support the display shelf module 108 on the back plane portion 106 of the shelf support frame 102, the display shelf module 108 is positioned such that the mounting clips 112 are inserted into corresponding mounting apertures 110 in the back plane portion 106. The weight of the display shelf module 108 locks the mounting clips 112 to the back plane portion 106 thereby securing the display shelf module 108 to the back plane portion 106 of the shelf support frame 102.

As noted above, the back plane portion 106 includes a plurality of mounting apertures 110 which are arrayed over the surface of the back plane portion 106 at regular intervals. The array of mounting apertures 110 facilitates positioning and repositioning the display shelf modules at various locations on the back plane portion 106. Accordingly, it should be understood that the display shelf modules 108 of the modular shelving system 100 may be arranged on the shelf support frame with various relative vertical and/or horizontal spacings (i.e., +/−Z and/or +/−Y in the coordinate axes depicted in FIGS. 1 and 2) between adjacent display shelf modules.

Further, while FIG. 2 schematically depicts the back plane portion 106 with mounting apertures 110 and the display shelf module 108 with mounting clips, it should be understood that other configurations are contemplated. For example, in an alternative embodiment, the display shelf module 108 may be constructed with one or more mounting apertures formed in a posterior end of the display shelf module 108 and the back plane portion 106 may be formed with an array of mounting clips for engaging with corresponding mounting apertures in the display shelf modules. Moreover, while the modular shelving system 100 has been described herein as comprising mounting apertures and mounting clips to facilitate the attachment, positioning, and repositioning of the display shelf module 108 on the back plane portion 106 of the support frame, it should be understood that other attachment mechanisms are possible, including, without limitation, threaded fasteners (i.e., bolts, screws, and the like), brackets, and the like.

Figure 3:
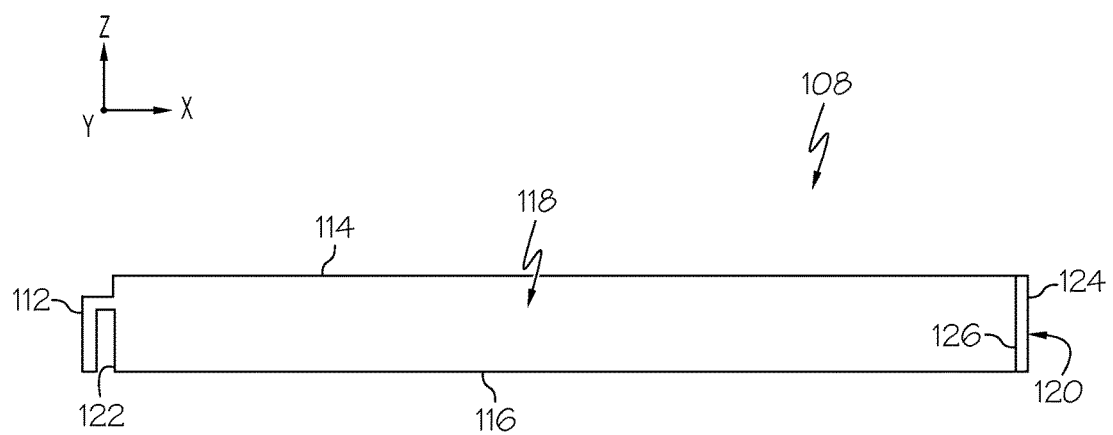
FIG. 3 schematically depicts a cross section of a display shelf module according to one or more embodiments shown and described herein.

Referring now to FIG. 3, a cross section of a display shelf module 108 is schematically depicted according to one or more embodiments described herein. The display shelf module 108 generally includes a top panel 114 and an optional bottom panel 116 which generally define an open (hollow) interior volume 118. The shelf may additionally include side panels (not shown) which connect the top panel 114 and the bottom panel 116 and further define the open interior volume 118. The top panel 114 is generally planar and facilitates the placement of products on the display shelf module 108 for viewing and selection by a customer. In some embodiments, the optional bottom panel 116 may be a substantially planar, solid sheet of material which completely encloses the bottom surface of the display shelf module 108. In other embodiments, the optional bottom panel 116 may comprise an open grill or grid work of discrete elements. In still other embodiments (not depicted), the optional bottom panel is omitted from the construction of the display shelf module 108. In the embodiments described herein, the display shelf module 108 also includes a rear panel 122 to which the mounting clip 112 is either coupled to or integrally formed with. The top panel 114, rear panel 122, side panels, and optional bottom panel 116 are formed from materials suitable for load bearing applications including, without limitation, steel, or aluminum alloys. Further, in some embodiments, the top panel 114, rear panel 122, side panels, optional bottom panel, or various combinations thereof, may be formed from a single sheet of material, such as sheet stock or the like, which is formed into the display shelf module 108. Alternatively, the top panel 114, rear panel 122, side panels, and optional bottom panel may be formed from separate sheets of material and joined together by welding, threaded fasteners, and/or various combinations thereof.

Still referring to FIG. 3, the display shelf module 108 further comprises a single display panel 120 affixed to the front of the display shelf module 108. The display panel 120 substantially extends continuously and uninterrupted in the width direction (i.e., in the +/−Y direction of the coordinate axes shown in FIG. 3) of the front of the display shelf module 108 and is generally formed from a translucent material. For example, in some embodiments, the display panel 120 is formed from a translucent polymeric material. In some embodiments, the display panel 120 may have a laminated structure. In other embodiments, the display panel 120 may be formed from a transparent polymeric material to which one or more layers of translucent film are applied, such as, for example, a Vikiti™ film manufactured by 3M. In still other embodiments, the display panel 120 may be formed from a thin glass substrate to which a translucent film is applied.

In some embodiments, the display panel 120 may further include a plurality of Fresnel lines formed in the back surface 126 of the display panel to improve the quality of the image data displayed on the front surface 124 of the display panel. For example, in one embodiment, the density of the Fresnel lines may be about 50 lines per centimeter. In another embodiment, the number of Fresnel lines may be greater than about 50 lines per centimeter, such as 100 lines per centimeter or more. Suitable screens incorporating Fresnel lines may be obtained from DNP Denmark including, without limitation XPS and CSI screens available from DNP Denmark. However, it should be understood that the geometry of the Fresnel pattern and the density of the Fresnel lines may be specifically tailored to the optical path between the projector and the screen.

The display panel 120 is generally constructed to facilitate the display of image data on the front surface 124 of the display panel 120 when an optical signal containing the image data is projected from within the interior volume 118 of the display shelf module 108 onto the back surface 126 of the display panel. Accordingly, it should be understood that the display panel 120 is a transmission-type screen.

In some embodiments described herein, the display shelf module 108 may be sealed to prevent exposing the projector and various optical and electronic components located within the display shelf module 108 to the external environment. For example, it is contemplated that the display shelf module 108 may be utilized in a refrigerated environment or an elevated temperature environment. In these embodiments, the top panel, rear panel, side panels, bottom panel, and display panel may be assembled with seals between the various panels to prevent moisture and/or condensation from entering the display shelf module 108. Suitable sealing materials include, without limitation, silicone, in particular RTV (room temperature vulcanizing) silicone, natural or synthetic elastomers or similar commercially available sealing materials.

In addition, the display panel 120 of the display shelf module 108 may comprise an anti-fog coating to prevent condensation on either the front or back surface of the display panel.

Figure 4:
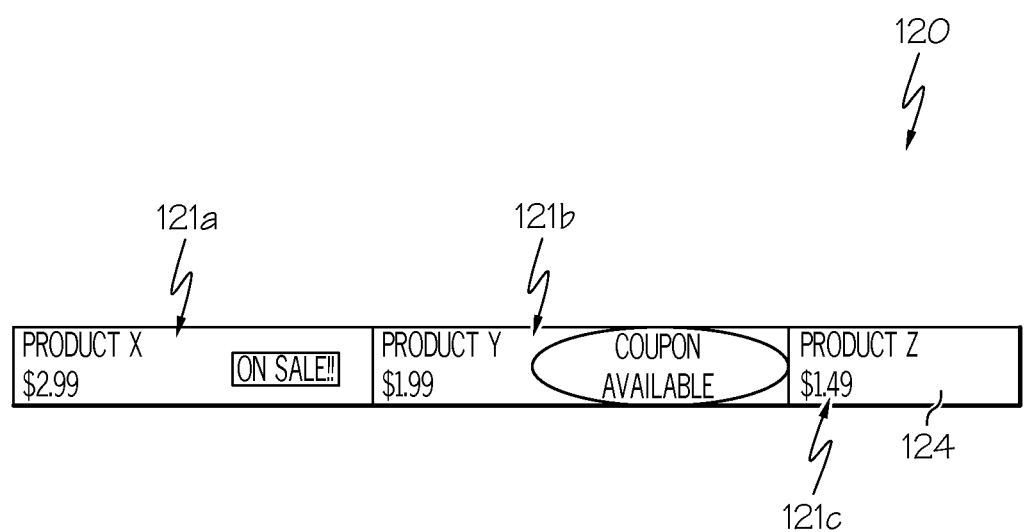
FIG. 4 schematically depicts the front surface of a display panel of the display shelf module of FIG. 3 with image data displayed thereon.

Referring to FIG. 4 by way of example, the front surface 124 of the display panel 120 of the display shelf module 108 is schematically depicted displaying image data 121*a*, 121*b*, 121*c* projected onto the back surface of the display panel 120. As shown in FIG. 4, the image data 121*a*, 121*b*, 121*c* projected onto the back surface of the display panel 120 is visible to a customer positioned in front of the display shelf module 108 and generally conveys information related to the products positioned on the display shelf module 108, such as, for example, the identity of the product, the size of the product, the price of the product, the manufacturer of the product, sale information, coupon information and other, similar information. In the embodiment shown in FIG. 4, information related to several different products may be simultaneously displayed on a single display screen. Accordingly, it should be understood that, in this embodiment, the segmentation of the display panel 120 into different product "labels" is a result of the content of the image data 121*a*, 121*b*, 121*c* projected onto the panel and is not due to the actual segmentation of the panel into individual, discrete screens.

Various visual media content may be projected onto the display panel 120. For example, in a "normal" mode, the display panel may display information about the products located on the display shelf module 108 (i.e., price, quantity, discounts and the like). Alternatively, the display panel may display other information. For example, the display panel may display store information, such as the location of certain sale items, manufacturer advertising (still and video), and/or store messages (i.e., store operating hours, safety alerts, and the like). Such information can be directly uploaded from a network or external computer system such that the information is displayed on a real time basis. Interactive content may also be displayed, as will be described in more detail herein.

Referring now to FIG. 5, in order to facilitate projection of the image data 121*a*, 121*b*, 121*c* onto the display panel 120, each display shelf module 108 includes a projector 206 and associated electronic and optical components to facilitate projecting an optical signal containing image data from the interior volume 118 of the display shelf module 108 and onto the back surface 126 of the display panel 120. In some embodiments described the optical signal which contains the image data is projected from within the interior volume of each display shelf module and the optical signal traverses a substantially horizontal optical path from the projector to the back surface of the display panel. The term "substantially horizontal," as used herein, means that the optical path between the projector and the back surface of the display panel does not have any portions or segments which are vertically oriented. Accordingly, it should be understood that, in some embodiments, the optical path may have elevational changes between the projector and the rear surface of the display panel, but does not have any vertically oriented segments. However, it should be understood that, in some other embodiments, the optical path between the projector and the back surface of the display panel may include one or more vertical components provided, however, that the entire the optical path is contained within the internal volume of a single display shelf module.

Figure 7:
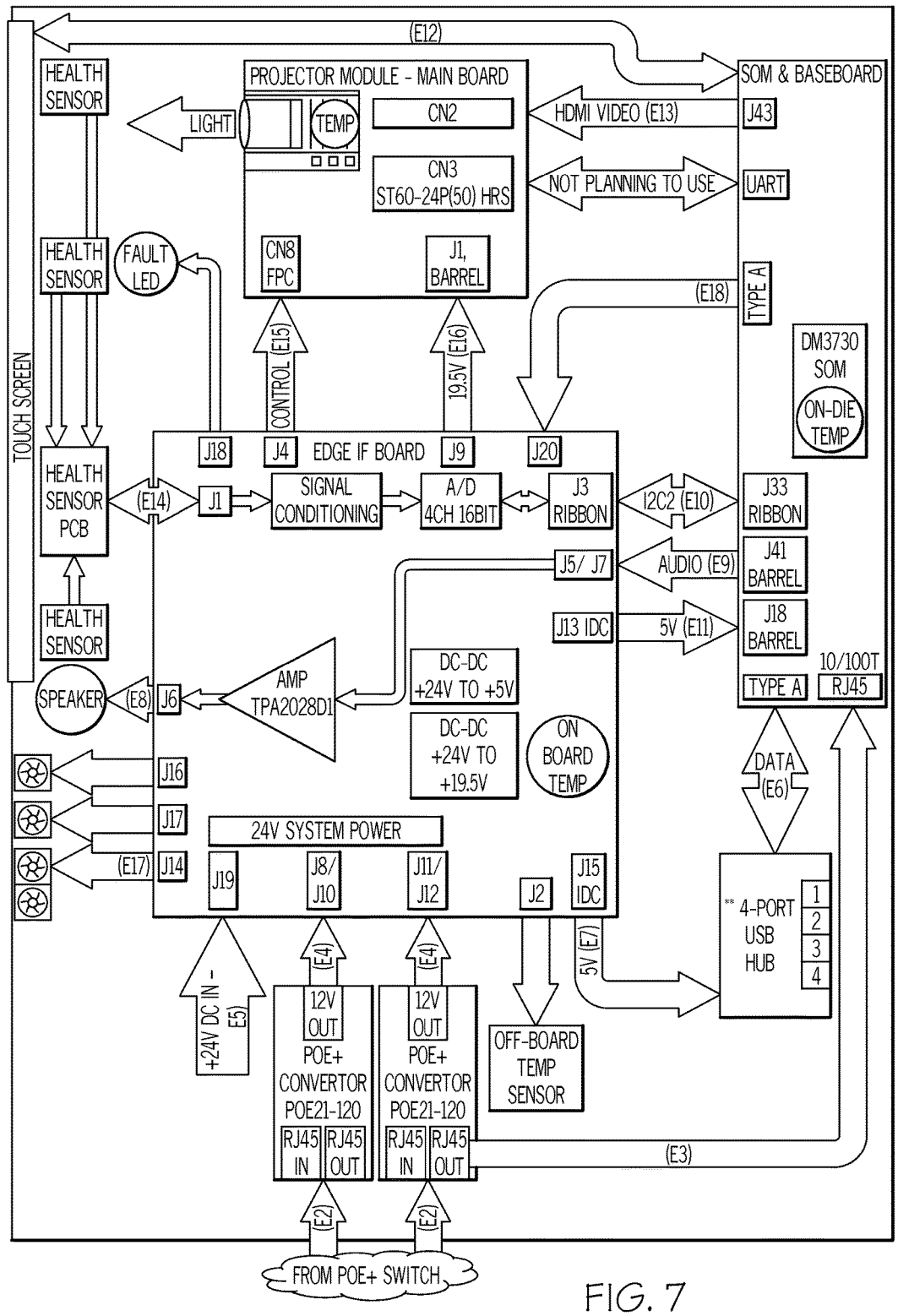
FIG. 7 schematically depicts the control circuitry of the projector located in each display shelf module of the modular shelving system, according to one or more embodiments shown and described herein.

In the embodiments described herein the projector 206 generally comprises a light source, such as a white light source or a plurality of laser sources (i.e., individual red, green and blue laser sources), a digital micro mirror device (DMD) which facilitates the construction of an image from a data signal, and control circuitry (schematically depicted in FIG. 7). The light source is optically coupled to the DMD and both the light source and the DMD are communicatively coupled to the control circuitry to facilitate projection of still and/or video images from a data signal transmitted from the control circuitry. In some embodiments, the projector 206 may comprise a light engine which includes a combination of the aforementioned components. For example, the light engine may be a stand-alone device which includes a DMD device optically coupled to one or more illumination elements (such as a white light source, an array of LED sources, and/or a plurality of laser sources), projection optics, and control circuitry. The control circuity is used to drive the DMD device and illumination element to create an image from a data signal. The created image is projected from the light engine (and the projector) with the projection optics. In some embodiments, the control circuitry of the projector may further comprise a speaker for playing an audible message, such as when the data signal further includes audio content. For example, in one embodiment, the control circuitry may comprise a memory, such as a hard drive or removable memory such as a memory card, in which image data is locally stored for projection with the projector 206 and a processor for executing a machine readable and executable programmed instruction set stored in the memory which facilitates projection of the image data. Alternatively, the projector 206 may be communicatively coupled to an external computer system 207, such as by a wired or a wireless connection. The external computer system 207 may comprise a memory in which the image data is remotely stored and transmitted to the control circuitry of the projector 206 for projection. The external computer system may also include a processor executing a machine readable and executable programmed instruction set stored in the memory of the external computer system which facilitates projection of the image data with the projector. The control circuitry of the projector 206 produces a control signal indicative of the image data to be projected and utilizes this control signal to form the image data with the light source and the DMD which, in turn, produce an optical signal containing the images to be projected.

While the projector 206 has been described herein as comprising a light source and a DMD device, it should be understood that various other types of projectors may be used in the display shelf module. For example, the projector may be an LCD projector, a scanning laser projector, or other, similar types of compact projector devices.

Still referring to FIG. 5, the display shelf module 108 also includes various optical components which facilitate the transmission of the optical signal produced by the projector 206 to the back surface 126 of the display panel 120. For example, in the embodiments described herein, each display shelf module 108 also includes a condenser lens 210, an image divider 212, a plurality of focusing lenses 214*a*, 214*b*, 214*c*, a front mirror 216 and at least one back mirror (back mirrors 218*a*, 218*b*, 218*c* depicted in FIG. 5).

The condenser lens 210 is positioned in the optical path between the projector 206 and the image divider 212 such that the optical signal emitted from the projector 206 passes through the condenser lens 210 before reaching the image divider 212. The condenser lens 210 concentrates the optical signal emitted from the projector 206, reducing the size of the images contained therein.

After passing through the condenser lens 210, the optical signal is incident on an image divider 212 which is positioned in the optical path of the optical signal emitted by the projector 206. The image divider 212 generally includes a plurality of mirrors (three in the embodiment shown in FIG. 5) which are stacked one atop the other such that the reflecting surface of each mirror is at an angle with respect to every other mirror in the stack. Due to the orientation of each mirror in the stack, the image divider 212 divides the optical signal from the projector 206 into a plurality of discrete optical signals 213*a*, 213*b*, 213*c*, each of which is redirected along a separate optical path. The number of discrete optical signals reflected from the image divider corresponds to the number of mirrors included in the stack. In some embodiments described herein, the image content of each discrete optical signal 213*a*, 213*b*, 213*c* may be the same, such as when the optical signal produced by the projector 206 contains image data for a plurality of copies of the same image. Alternatively, the image content of the discrete optical signals 213*a*, 213*b*, 213*c* reflected from the image divider 212 may be different from one another, such as when the optical signal produced by the projector 206 contains content for multiple different images and the image divider 212 divides the optical signal from the projector into discrete optical signals, each discrete optical signal being indicative of a different image. The image divider is orientated to reflect the discrete optical signals 213*a*, 213*b*, 213*c* towards the front mirror 216.

Referring now to FIGS. 5 and 6, the front mirror 216 is located in the interior volume 118 of the display shelf module 108 and extends over at least a portion of the width of the display shelf module 108. The reflective surface of the front mirror 216 is oriented to reflect the discrete optical signals 213*a*, 213*b*, 213*c* to the back mirrors 218*a*, 218*b*, 218*c* positioned at the rear of the display shelf module 108. Before reaching the front mirror 216, the plurality of discrete optical signals 213*a*, 213*b*, 213*c* pass through a plurality of focusing lenses 214*a*, 214*b*, 214*c*, respectively. The focusing lenses 214*a*, 214*b*, 214*c* are disposed in the optical path between the image divider 212 and focus the plurality of discrete optical signals 213*a*, 213*b*, 213*c* onto the front mirror 216 which, in turn, reflects the discrete optical signals 213*a*, 213*b*, 213*c*, to a corresponding back mirror 218*a*, 218*b*, 218*c*. The back mirrors 218*a*, 218*b*, 218*c* are oriented to reflect the discrete optical signals 213*a*, 213*b*, 213 towards the front of the display shelf module 108 and onto the back surface 126 of the display panel 120 such that the image data in each discrete optical signal is visible on the front side 124 of the display panel 120. A side view of the optical path from the image divider 212 to the back surface 126 of the display panel 120 is schematically depicted for one discrete optical signal 213*b*.

Figure 13A:
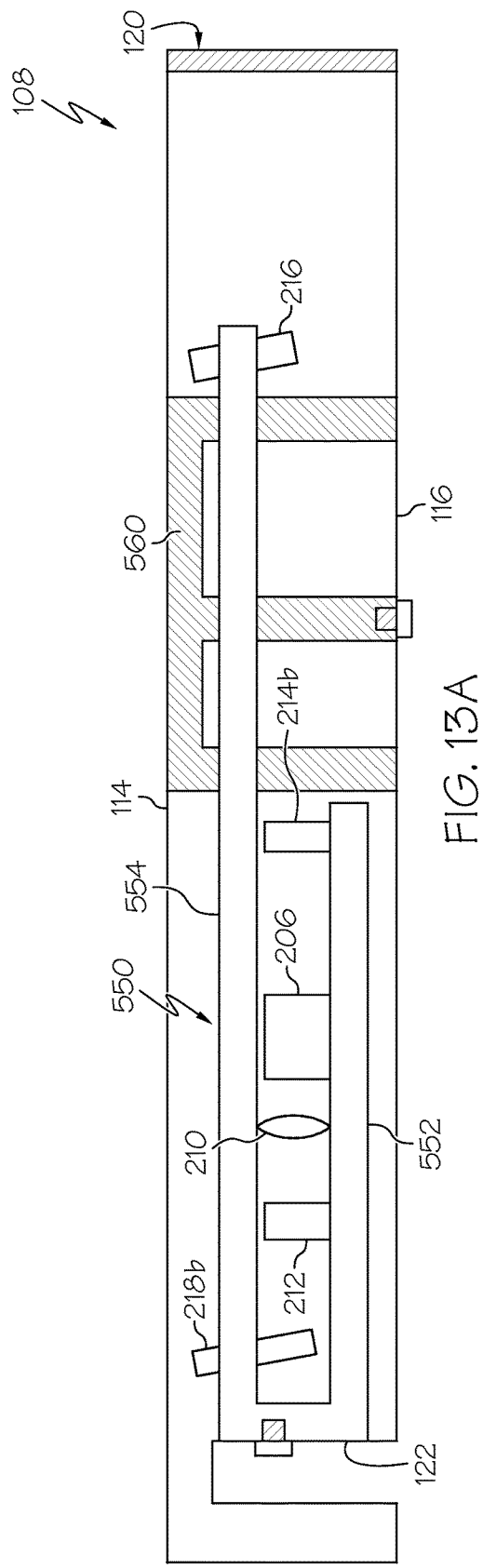

Referring now to FIGS. 13A and 13B, in one embodiment, the optical components (i.e., the projector 206, mirrors 216, 218*a*, 218*b*, 218*c*, image divider 212, condenser lens 210 and focusing lenses 214a, 214b, 214c) of the display shelf module 108 are at least partially mechanically isolated from the top panel 114 and the bottom panel 116 of the display shelf module 108. In this embodiment, the optical components of the display shelf module are mounted on a floating frame 550 which is affixed to the rear panel 122 of the display shelf module, such as with screws, adhesive or the like. The floating frame 550 includes a base 552 and a pair of cantilevered support arms 554 which are attached to the base 552. The base 552 is spaced apart from the top panel 114 and the bottom panel 116 of the display shelf module 108. The projector 206, image divider 212 and condenser lens 210 are mounted on the base 552. The mirrors are attached to the cantilevered support arms 554. Accordingly, it should be understood that the floating frame 550 allows the optical components to "float" between the top panel 114 and the bottom panel 116 thereby at least partially isolating the optical components from the top panel 114 and bottom panel 116 of the display shelf module.

In one embodiment, the floating frame 550 further comprises at least one floating stanchion 560 extending between the top panel 114 and the bottom panel 116 of the display shelf module 108. In the embodiments described herein, the floating stanchion 560 is affixed to the bottom panel 116 of the display shelf module 108 and couples the top panel 114 and the bottom panel 116 such that, in the event that either the top panel 114 and the bottom panel 116 deflect, the deflection is transmitted to the opposing surface without interfering with the optical components (and the alignment of the optical components) in the display shelf module 108, thereby allowing the optical components to remain "floating" between the top panel 114 and the bottom panel 116. This floating frame 550 used either with or without floating stanchions 560, offers some degree of protection to the optical components and prevents the optical components from becoming misaligned and/or damaged to heavy loads applied to the top or bottom surfaces of the display shelf module.

While the at least one back mirror is described herein and depicted in FIG. 5 as comprising a plurality of back mirrors 218a, 218b, 218c, it should be understood that, in other embodiments, the back mirror may be constructed as a single mirror, such as when the back mirror is curved.

Further, while the display shelf module is depicted in FIG. 5 as comprising a specific configuration of optical components to facilitate directing an optical signal onto the back surface of the display panel 120, it should be understood that other configurations are contemplated. For example, in one embodiment, a prism may be utilized in place of the image divider 212 to facilitate reducing the optical signal produced by the projector into a plurality of discrete optical signals. Alternatively, a plurality of lenselets may be utilized to reduce the optical signal produced by the projector into a plurality of discrete optical signals.

In the embodiments of the display shelf module 108 shown and described herein, the projector and various optical components utilized to project an image on the display panel are located within each display shelf module. This modular design allows the position of the display shelf module to be adjusted vertically and/or horizontally on the back plane without changing the optical path length between the projector and the display panel. As such, a shelving system incorporating one or more of the display shelf modules can be easily and rapidly reconfigured to accommodate different shelf spacings, numbers of shelves and shelf orientations without changing and/or adding additional optical components to accommodate changes in the optical path.

Figure 14:
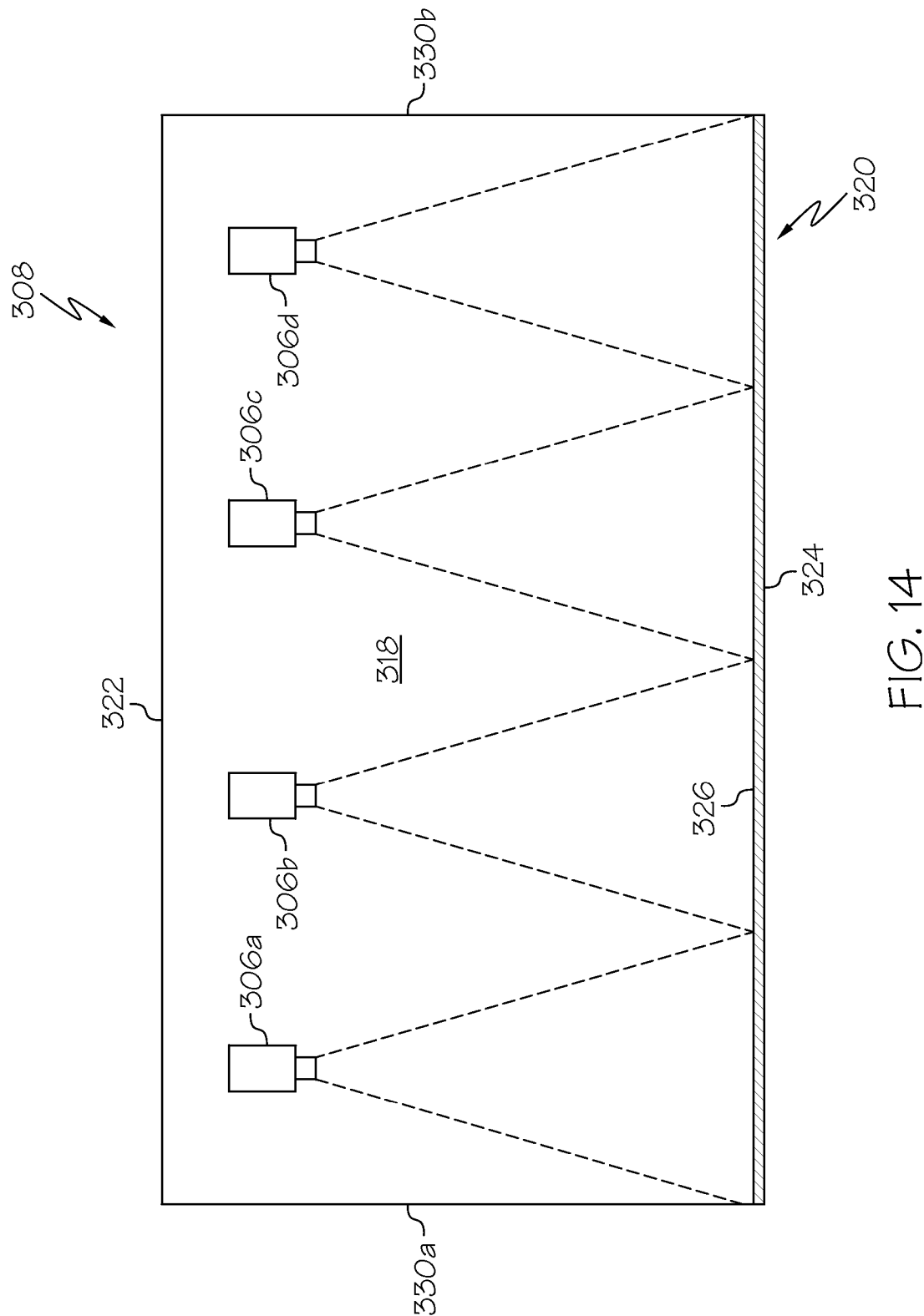
FIG. 14 schematically depicts one embodiment of a display shelf module with multiple projectors.

While FIGS. 5 and 6 depict an embodiment of the display shelf module in which a single projector is utilized in conjunction with an image divider to display a plurality of images from a single optical signal, it should be understood that other embodiments are contemplated. Referring to FIG. 14 by way of example, a top view of another embodiment of a display shelf module 308 is schematically depicted. In this embodiment, the display shelf module 308 generally includes a top panel (not shown), an optional bottom panel, a rear panel 322, and side panels 330a, 330b which together generally define an open (hollow) interior volume 318, as described above with respect to FIG. 3. The display shelf module 308 may also include a mounting clip (not shown) attached to or integrally formed with the rear panel 322. The top panel, rear panel, side panels, and optional bottom panel are formed from materials suitable for load bearing applications including, without limitation, steel or aluminum alloys. Further, in some embodiments, the top panel, rear panel, side panels, optional bottom panel, or various combinations thereof, may be formed from a single sheet of material, such as sheet stock or the like, which is formed into the display shelf module 308. Alternatively, the top panel, rear panel, side panels, and optional bottom panel may be formed from separate sheets of material and joined together by welding, threaded fasteners, and/or various combinations thereof. The display shelf module 308 further comprises a single display panel 320 affixed to the front of the display shelf module 308, as described herein with respect to FIG. 3. However, in this embodiment, the display shelf module comprises a plurality of projectors 306a-306d which are positioned in the interior volume 318 of the display shelf module 308. Each projector is oriented to project image data on a portion of the back surface 326 of the display panel 320 such that the image data is visible on the front surface 324 of the display panel 320. Each of the plurality of projectors 306a-306d projects discrete images and/or video content onto the display panel 320. In some embodiments, the image data projected by each projector is related to the image data projected by the remaining projectors such that the image data displayed on each portion of the front surface 324 is related to the image data displayed on adjacent portions of the front surface. For example, in some embodiments, the image data projected by each projector is a portion of a single image projected on the front surface 324 of the display panel.

Referring now to FIGS. 5 and 7, in some embodiments, the display shelf module may further include at least one photo detector. In the embodiment of the display shelf module 108 depicted in FIG. 5, the display shelf module includes a first photo detector 220a, a second photo detector 220b, and a third photo detector 220c. The photo detectors are positioned proximate the display panel such that the optical signal from the projector is incident on the photo detectors prior to reaching the optical display panel. For example, the photo detectors may be attached to the back surface 126 of the display panel 120 or, alternatively, positioned adjacent to the back surface 126 of the display panel. Each of the photo detectors is communicatively coupled to the control circuit of the projector, either by a wired electrical connection or, alternatively, with a light pipe which optically couples the photo detectors to the control circuit of the projector 206.

In one embodiment, each photo detector is calibrated to detect the intensity of a different wavelength of light. For example, the first photo detector may be calibrated to detect the intensity of a first wavelength range of visible light, the second photo detector may be calibrated to detect the intensity of a second wavelength range of visible light, and the third photo detector may be calibrated to detect a third wavelength range of visible light. In one embodiment, the first wavelength range includes wavelengths within the red portion of the visible spectrum, the second wavelength range includes wavelengths within the blue portion of the visible spectrum, and the third wavelength range includes wavelengths within the green portion of the visible spectrum. In this embodiment, the photo detectors are particularly well suited to monitor the intensity of the optical signal projected by the projector when the light source of the projector includes individual red, blue, and green laser light sources.

The photo detectors 220a, 220b, 220c output an intensity signal indicative of an intensity of the optical signal projected by the projector and transmit the intensity signal to the control circuit of the projector 206. In one embodiment, a processor of the control circuit of the projector 206 analyzes the intensity signals from the photo detectors and determines if any of the intensity signals are below a threshold intensity value. If any of the intensity signals from the photo detectors are below the threshold intensity value, the control circuit outputs an error signal. The error signal from the control circuit may be converted into a visible and/or audible signal. For example, the error signal may be used to illuminate an LED indicator thereby providing a visible signal that the display shelf module may require service.

In embodiments where the projector 206 is coupled to an external computer system 107, as described above, the photo detectors 220a, 220b, 220c output intensity signals indicative of an intensity of the optical signal projected by the projector and transmit the intensity signals to the control circuit of the projector 206. In turn, the control circuit relays the intensity signals to the external computer system 207. A processor of the external computer system 207 analyzes the intensity signals and determines if any of the intensity signals are below a threshold intensity value. If any of the intensity signals from the photo detectors are below the threshold intensity value, an error signal is generated by the external computer system. In one embodiment, the error signal generated by the external computer system causes a visible error message to appear on a user interface, such as a monitor or the like. In another embodiment, the error signal generated by the external computer system may be converted into a visible and/or audible signal. For example, the error signal may be used to illuminate an LED indicator thereby providing a visible signal that the display shelf module may require service.

Figure 8:
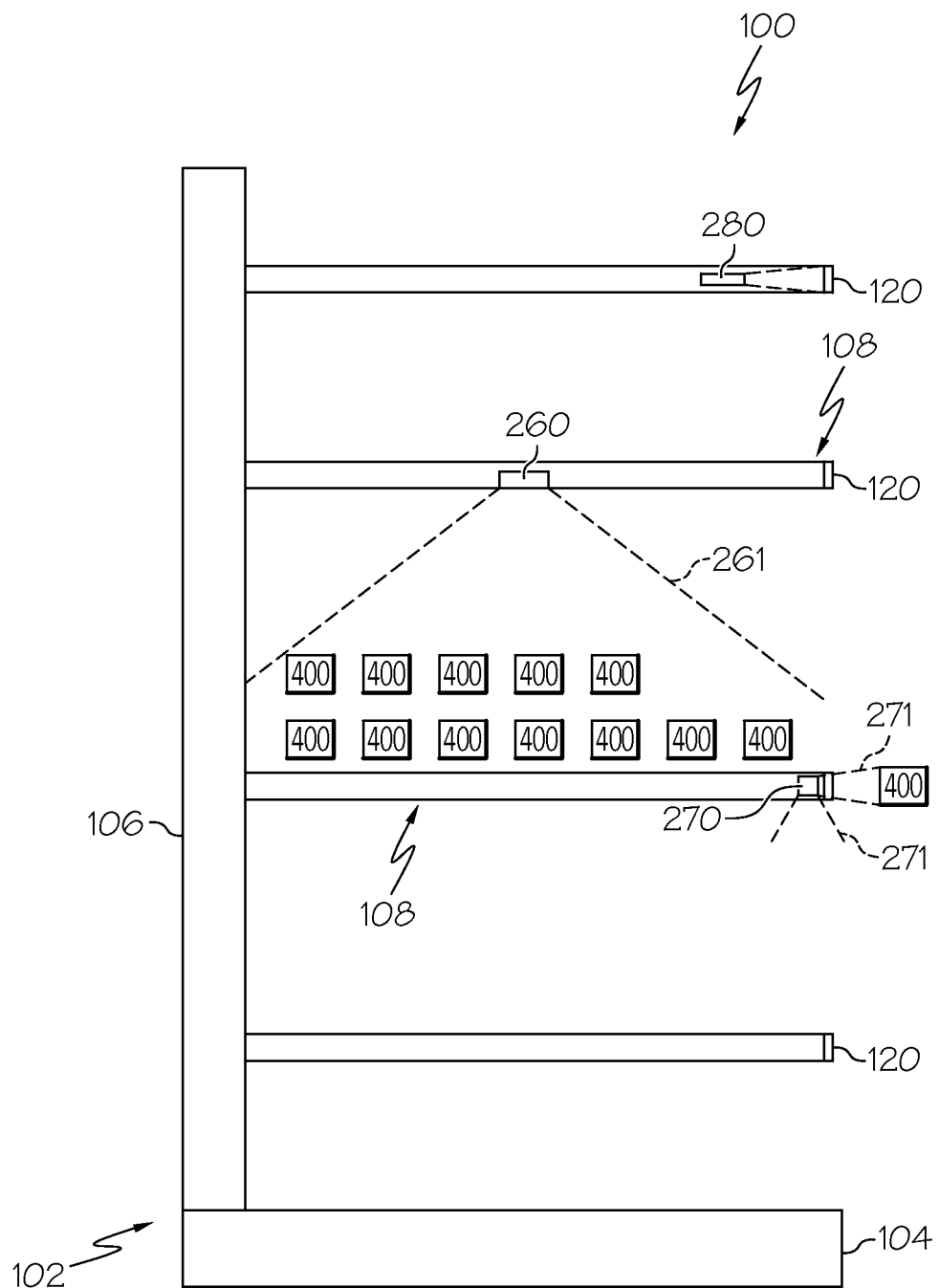
FIG. 8 schematically depicts a cross section of a modular shelving system according to one or more embodiments shown and described herein.
Figure 9:
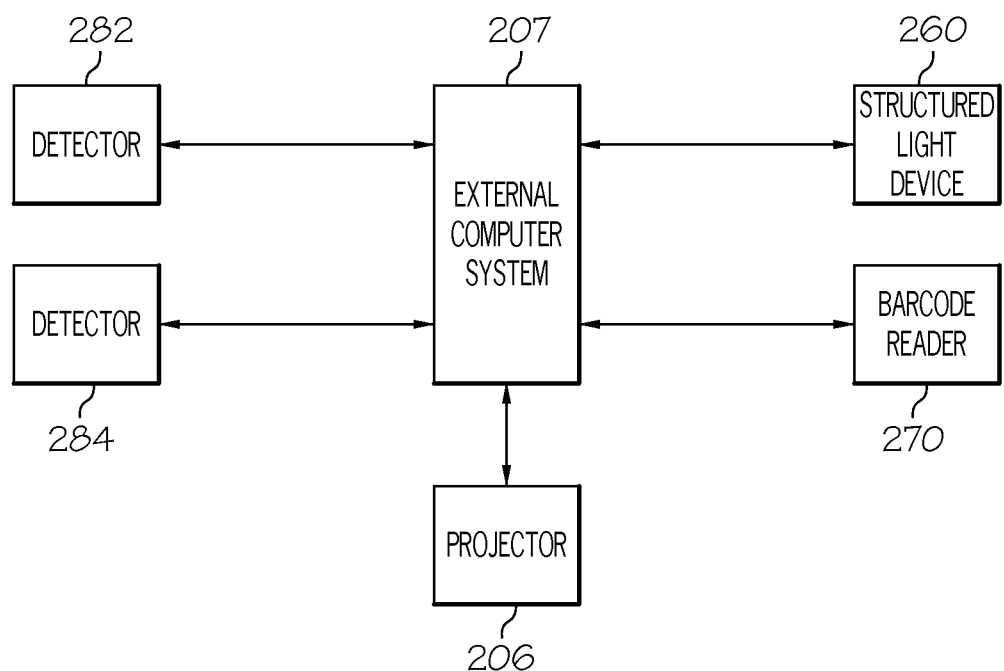
FIG. 9 schematically depicts the interconnectivity of various components of the modular shelving system according to one or more embodiments shown and described herein.

Referring now to FIGS. 8 and 9, in some embodiments the display shelf modules 108 may further comprise a structured light device 260. The structured light device 260 includes a light source for projecting an array of light 261, such as a grid or bars of light, and a sensor for capturing an image of the projected array of light 261. The array of light may be visible light or, alternatively, infrared light. In the embodiments described herein, the structured light device 260 is positioned in the interior volume of the display shelf module 108 and oriented to project the array of light 261 downward, onto the surface of a vertically adjacent display shelf module 108. The structured light device 260 is communicatively coupled to the external computer system 207, as schematically depicted in FIG. 9. Accordingly, it should be understood that the external computer system 207 may be utilized to control the structured light device 260 with control signals propagated from the external computer system 207 and to process data signals received from the structured light device 260.

The structured light device 260 projects the array of light 261 onto the surface of a vertically adjacent display shelf module 108 and any product 400 positioned on the vertically adjacent display shelf module 108. The structured light device 260 also captures an image of the projected array of light 261 and transmits the image data to the external computer system for a determination of the amount of product positioned on the display shelf module 108. Specifically, the image of the array of light 261 projected on the display shelf module 108 changes based on the amount and orientation of product 400 positioned on the display shelf module 108 and the external computer system determines the amount of product positioned on the shelf and/or when the shelf needs to be restocked.

In one embodiment, the external computer system 207 may compare the captured image of the projected array of light 261 to an image of the array of light when the shelf has a predetermined amount of product, such as when the shelf is fully stocked with product 400 and/or to an image of the array of light when the shelf is empty. Based on this comparison, the external computer system determines if additional product 400 should be added to the shelf.

In another embodiment, the external computer system 207 may compare the captured image of the projected array of light to an image of the array of light when the shelf has a predetermined amont of product using a plurality of images stored in a look up table (LUT) in the memory of the external computer system. Each of the plurality of images stored in the LUT corresponds to an image of the array of light projected onto a display shelf unit with differing amounts of product positioned on the shelf. The external computer system 207 determines the amount of product 400 positioned on the shelf and/or if additional product 400 should be added to the shelf based on the comparison of the captured image of the projected array of light and the plurality of images stored in the LUT.

It is also contemplated that the structured light device 260 and the external computer system 207 may be used to track various trends by monitoring the amount of product positioned on a shelf over a given time interval. Such trends may include consumer purchasing habits, rates of product removal, the timing and speed of product restocks, and the like.

While the shelf module shown in FIGS. 8 and 9 is described as including a structured light device 260, it should be understood that other devices for monitoring the amount of product on the shelf may also be used. For example, in an alternative embodiment (not shown), the display shelf module may, in the alternative, include a stereoscopic vision system which is used to capture images of product positioned on the shelf below. The stereoscopic vision system may be communicatively coupled to the external computer system and configured to send images of the product positioned on the shelf below to the external computer system. The external computer system analyzes the images in a similar manner as described above with respect to the structured light device and, based on the analysis, determines the amount of product positioned on the shelf and whether the shelf needs to be restocked, etc.

Still referring to FIGS. 8 and 9, in another embodiment, the display shelf modules 108 of the modular shelving system 100 may additionally or alternatively include a bar code reader 270. The bar code reader 270 may be positioned proximate the front edge of the display shelf module 108 and oriented to scan a bar code presented in front of the display panel of the shelf and/or below the bottom panel of the shelf, as depicted in FIG. 8. The bar code reader utilizes projected light 271 to scan a bar code and transmits a signal to the external computer system 207 indicative of the scanned bar code. Accordingly, it should be understood that the bar code reader 270 is communicatively coupled to the external computer system 207, as shown in FIG. 9.

In one embodiment, the external computer system 207 utilizes the signal indicative of the scanned bar code to identify the product associated with the bar code from a database of product information indexed according to the bar codes. The external computer system 207 may then project information related to the product, such as price, discounts, etc., onto the display panel with the projector 206.

In another embodiment, when a bar code is scanned with the bar code reader 270, the external computer system 207 displays a prompt on the display panel 120 prompting the user to input customer account information either by direct input through the display panel 120 (described further herein) or with the bar code reader 270. The external computer system 207 may then project information related to the product onto the display panel with the projector 206, store information related to the product in an electronic account associated with the customer account information, and/or email information related to the product to an email address associated with the customer account information.

Still referring to FIGS. 8 and 9, in another embodiment, the display panel 120 of the display shelf modules 108 of the modular shelving system 100 may be a touch screen. Various technologies may be utilized to facilitate the touch functionality of the display panel 120 including, without limitation, infrared touch screen technologies, and/or optical touch screen technologies. For example, in one embodiment, the display panel 120 is an optical touch screen. In this embodiment, the display shelf module 108 includes one or more infrared back lights 280 which illuminate the rear surface of the display panel 120 with infrared light. The display shelf module 108 also includes one or more detectors 282, 284 (not shown in FIG. 8) such as image sensors. The detectors are positioned within the interior volume of the display shelf module 108 and oriented to capture an image of the rear surface of the display panel 120. The detectors 282, 284 are communicatively coupled to the external computer system 207 and propagate data signals indicative of images of the back surface of the display panel 120 to the external computer system 207.

In operation, the rear surface of the display panel 120 is flooded with infrared light from the infrared back lights 280. Simultaneously, an optical signal is projected onto the back surface of the display panel 120 with the projector 206 (FIG. 5) which results in image data being displayed on the front surface of the display panel 120, as described above. The image data being displayed may be interactive, such as when the image data prompts a customer to touch a certain area of the display panel to access additional information, prompts the customer to touch a certain area of the display panel to input additional information, or the like. When the customer contacts the display panel, the contact registers as a shadow on the rear surface of the display panel. The detectors 282, 284 relay images of the shadow to the external computer system 207 which determines the position of the shadow on the display panel based on a comparison of the images. In one embodiment, if the external computer system determines that the position of the shadow corresponds to the location of the interactive image data, the external computer system projects new image data onto the display panel. In another embodiment, where the customer is prompted to enter additional information such as through a projected virtual keypad, the external computer system correlates the shadows to key positions of the virtual key pad and processes the inputs accordingly.

Figure 10A:
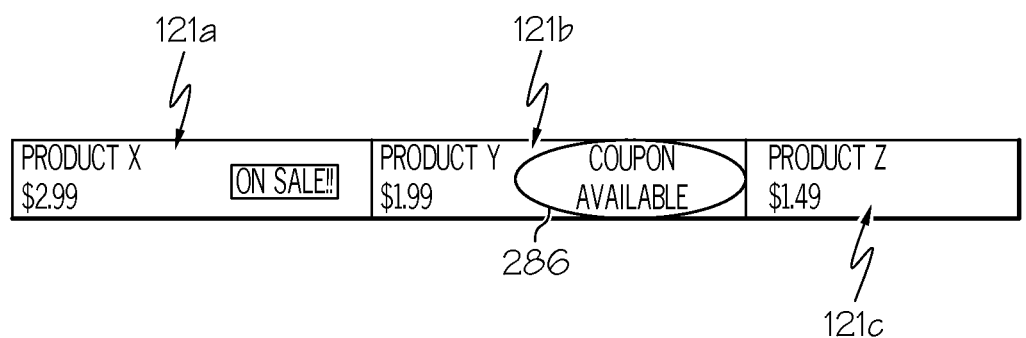
FIGS. 10A and 10B schematically depict interactive image content displayed on a display panel with touch functionalities, according to one or more embodiments shown and described herein.
Figure 10B:
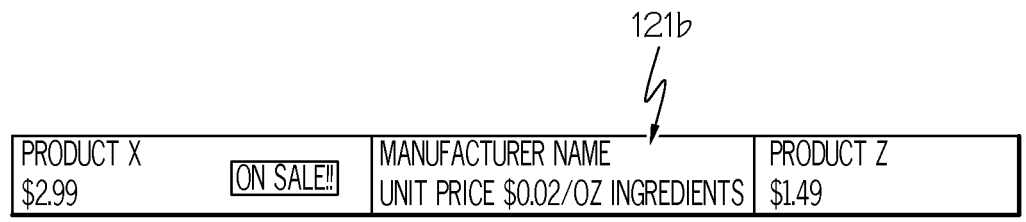

Referring to FIGS. 8-9 and 10A-10B by way of example, the display panel 120 of the display shelf module 108 is schematically depicted displaying image data 121a, 121b, 121c. When a customer contacts the virtual button 286 labeled "Product Information", the external computer system 207 determines that the location of the contact corresponds to the virtual button 286 utilizing detectors 282, 284 and updates the display image data 121b to display the requested product information, as shown in FIG. 10B.

Accordingly, it should be understood that, when the display panel 120 includes touch functionalities, the display shelf modules 108 may be utilized to display interactive content which is updated according to inputs received by the customer. Moreover, it should be understood that the touch functionality of the display panel 120 may also be used by store personnel and/or vendors to input settings into the projector 206 and/or external computer system 207.

Figure 12:
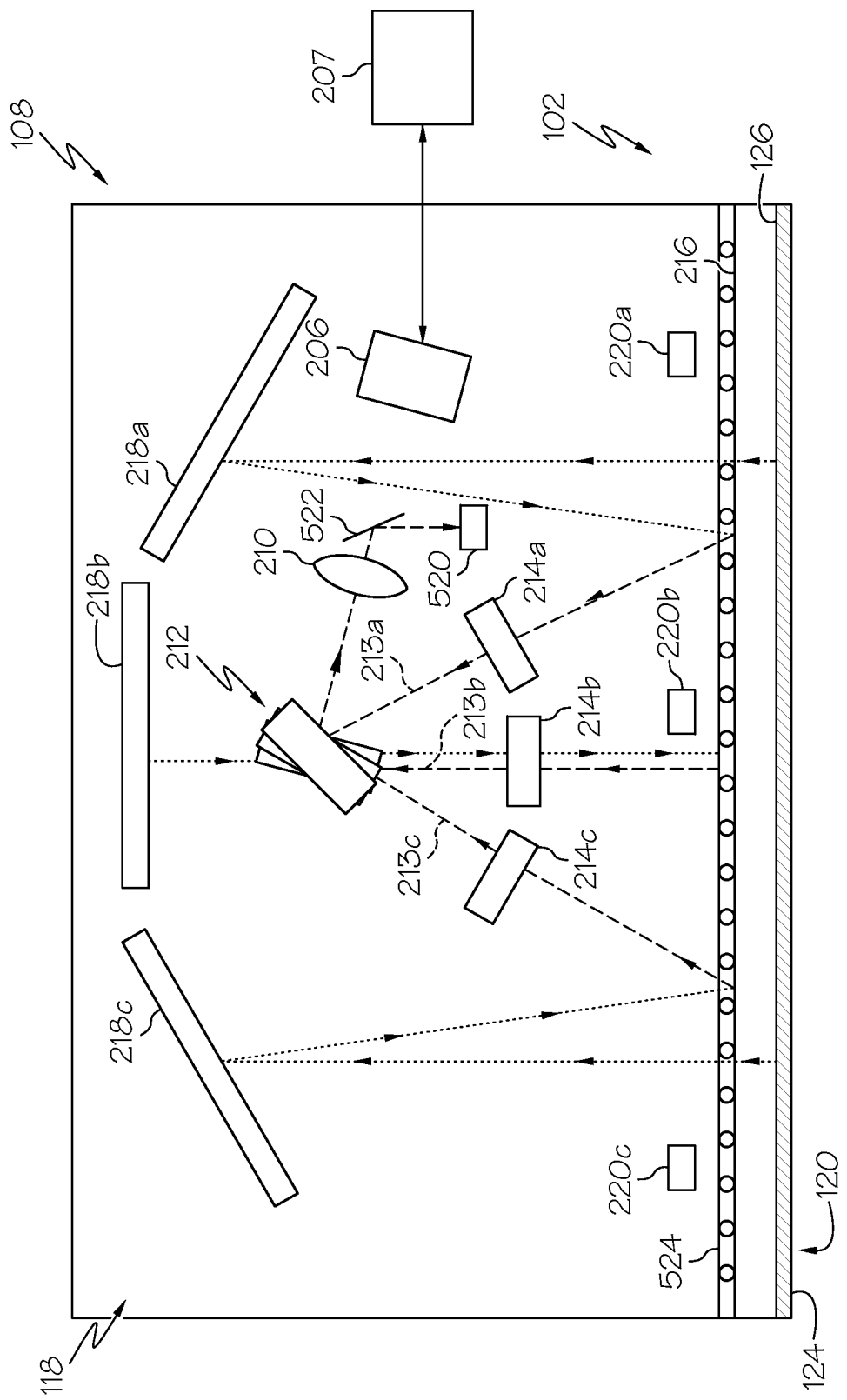
FIG. 12 schematically depicts the projector and various optical and electrical components positioned in the interior volume of the display shelf module according to another embodiment shown and described herein.

Referring now to FIG. 12, another embodiment of a display shelf module 108 with touch functionalities is schematically depicted. In this embodiment, the display shelf module 108 further includes a beam splitter 522, such as a dichroic beam splitter, which is positioned in the optical path between the projector 206 and the condenser lens 210. The beam splitter 522 is arranged to direct an image of the back surface 126 of the display panel 120 onto an optical sensor 520, such as an infrared sensitive camera. The optical sensor 520 is communicatively coupled to the external computer system 207 and configured to relay a signal to the external computer system indicative of an image of the back surface 126 of the display panel 120. The display shelf module further includes an array 524 of infrared LED elements which are positioned in the interior volume 118 of the display shelf module 108 such that the LED elements illuminate the back surface 126 of the display panel 120 with infrared light.

In operation, the back surface 126 of the display panel 120 is illuminated with infrared light from the array 524 of infrared LED elements and an image of the back surface 126 of the display panel 120 is captured with the sensor 520. Specifically, the infrared light from the array 524 illuminates the back surface 126 of the display panel 120 and the light reflected from the back surface 126 of the display panel retraces the optical path from the back surface 126 of the display panel 120 to the beam splitter 522. The beam splitter 522 directs the infrared light onto the sensor 520 rather than allowing the light to pass back through the beam splitter 522 and reach the projector 206. The sensor 520 captures the image of the back surface 126 of the display panel 120 and relays a signal indicative of the image to the external computer system 207. When interactive image content is displayed on the front surface 124 of the display panel 120, as described above, and a user interacts with the display panel 120 by pressing a virtual button projected on the front surface 124 of the display panel, the contact with the display panel 120 appears as a shadow or dark spot on the infrared image of the back surface 126 of the display panel 120. The external computer system 207 analyzes the image to determine the location of the shadow and, if the location corresponds to the location of a virtual button or other interactive content of the image data, updates the image data displayed on the display panel 120 based on the location of the shadow.

In other embodiments, the display shelf module may include one or more devices utilized for marker or markerless detection and identification of objects. For example, in one embodiment (not shown), structured light may be projected through the display panel and monitored with a vision system, as described above with reference to FIG. 8. The interaction of the structured light with an object, such as a person, product, shopping cart or the like, may be used by the external system to identify and/or assist in the identification of the object. Once the object is identified, information about the object may be displayed on the display panel.

In another embodiment (not shown), the display shelf modules may include an eye tracking system communicatively coupled to the external computer system to determine when a customer is looking in the direction of the shelf. When the external computer system detects that a customer is looking in the direction of the shelf, additional content may be displayed on the display panel to draw the customer's attention to the product on the shelf. Accordingly, the eye tracking system may be utilized to adjust the content projected onto the display panel. Alternatively, the external computer system may simply record a count each time a customer looks at the shelf. This type of data may be used for market research purposes.

In some other embodiments, the display shelf module may utilize various wireless technologies to communicate information to, and receive information from, various other devices. For example, the display shelf module may utilize wireless technology to send information to a consumer's smart phone or similar device, when prompted by inputs to the touch screen display panel. In other embodiments, the control circuitry and/or external computer system of the display shelf module may wirelessly receive data from a network and display that data on the display panel.

In some embodiments described herein, the various components of the display shelf module are powered through an Ethernet connection. In these embodiments, the projector 206 of the display shelf module 108 is communicatively coupled to an external computer source with a wired Ethernet connection. The Ethernet connection enables the exchange of data between the projector and the external computer system 107 and also provides power to the projector 206 and related components (i.e., sensors, LEDs, USB ports, cooling fans, etc.) which are electrically coupled to the control circuitry of the projector.

Figure 11:
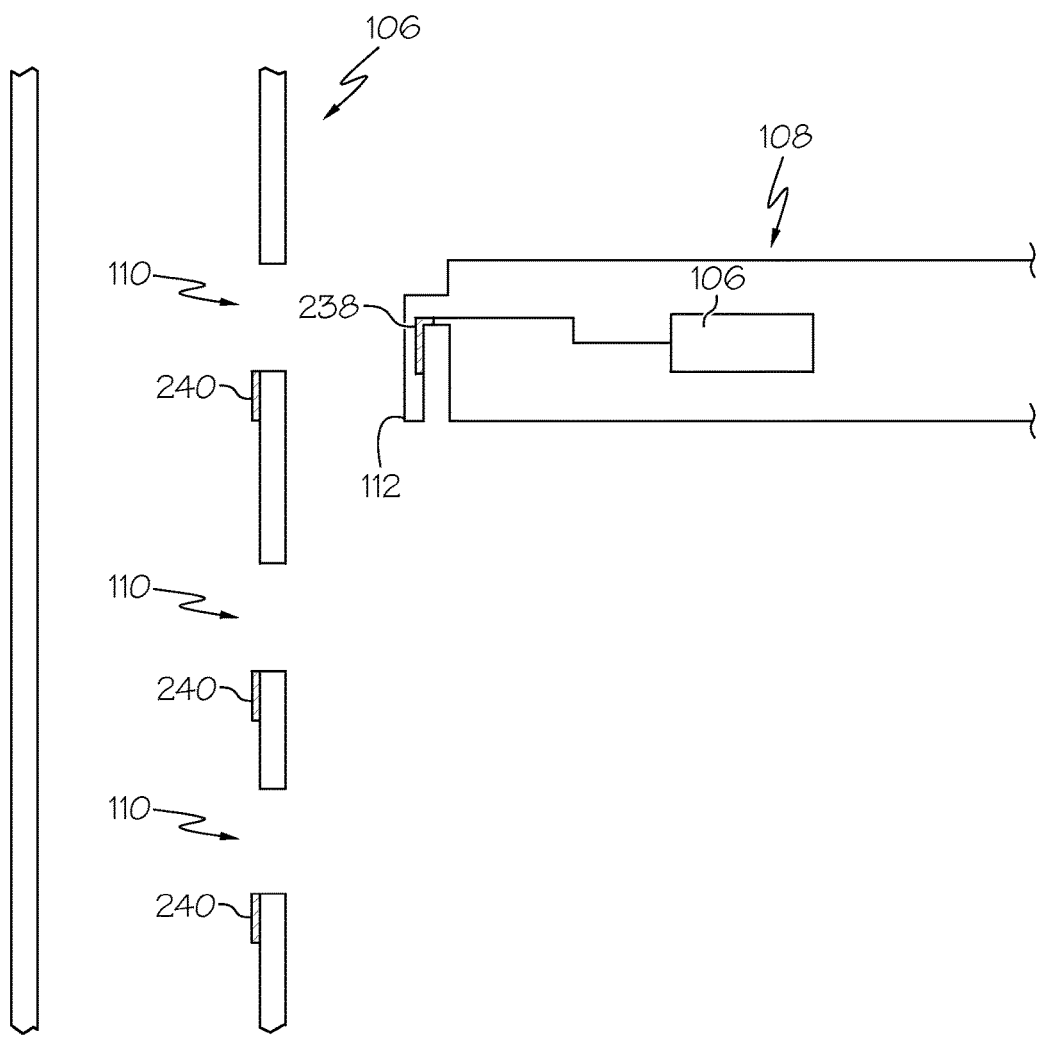
FIG. 11 schematically depicts one embodiment of a display shelf module which is powered through the back plane portion of the shelf support frame.

In another embodiment, the various components of the display shelf module 108 are powered through the back plane portion 106 of the shelf support frame. Referring to FIG. 11 by way of example, the back plane portion 106 of the shelf support frame may include an electrical contact 240 positioned on an interior surface of the back plane portion 106 proximate the mounting apertures 110. The electrical contact 240 is electrically coupled to a power source (not shown) such that the electrical contact may be energized. In this embodiment, the mounting clips 112 located at the posterior end of the display shelf module 108 further comprise an electrical contact 238. The electrical contact 238 may be electrically coupled to the projector 206 and positioned such that, when the display shelf module 108 is positioned on the back plane portion 106 and the mounting clip 112 is engaged with the mounting aperture 110, the electrical contact 240 in the back plane portion 106 is electrically coupled to the electrical contact 238 of the display shelf module 108 thereby providing power to the projector 206 and/or other electrical components positioned in the interior volume of the display shelf module 108.

Referring now to FIGS. 15 and 16, in some embodiments, the display shelf module may include a shelf portion and a detachable projector unit removably coupled to the shelf portion. For example, FIG. 15 schematically depicts a side view of an alternative embodiment of a display shelf module 358 which includes a shelf portion 360 and a detachable projector unit 362. The shelf portion 360 generally includes a top panel 374 on which product can be placed and displayed and one or more mounting clips 412 (one shown) for attaching the shelf portion 360 to a back plane portion of a modular shelving system, as described hereinabove with respect to FIGS. 1-3. However, in this embodiment, the various projector components of the display shelf module 358 are housed in a detachable projector unit 362 which is removably coupled to the shelf portion 360 of the display shelf module 358. Specifically, the detachable projector unit 162 is an enclosure having an optional bottom panel 376, side panels 378, a display panel 420, and an optional rear panel 382 which generally form an open interior volume in which the various projector components and other electronic components of the display shelf module are installed. The various projector components may be as described hereinabove with respect to FIGS. 5-6, 12, 13A-13B, and 14. In addition the detachable projector unit 362 may also comprise a structured light device, bar code reader, or the like, as described herein.

Still referring to FIGS. 15 and 16, the detachable projector unit 362 may be attached to the shelf portion 360 in a variety ways. For example, in some embodiments, the detachable projector unit 362 may be attached to the shelf portion 360 with threaded fasteners, such as screws or bolts, such that the detachable projector unit 362 may be readily detached from the shelf portion 360. Alternatively and/or additionally, the shelf portion 360 may be formed with channels 370, 372 for receiving corresponding flanges 366, 368 extending from the side panels 378, 380 of the detachable projector unit 362. The flanges 366, 368 may be slidably received in the channels 370, 372 such that the detachable projector unit 362 is removably attached to the shelf portion 360.

Constructing the display shelf module 358 such that the detachable projector unit 362 is removably attached to the shelf portion 360 facilitates the use of a single size of detachable projector unit in conjunction with display shelf modules 358 of varying depths. For example, the display shelf modules 358 may be constructed with different depths D (shown in FIG. 15) depending on the specific application and/or type of product to be displayed on the display shelf module. However, the projector components are positioned within the module and secured to create a fixed optical path between the projector and the display shelf and, as such, the projector components may only require a fixed volume within the module which generally corresponds to a fixed depth dimension d (shown in FIG. 15). Accordingly, the actual portion of the display shelf module 358 which houses the projector components need not extend to the full depth D of the display shelf module. Instead, one single design of a detachable projector unit 362 with fixed dimensions can be utilized in conjunction with display shelf modules of differing dimensions, thereby minimizing variations in the overall design and decreasing manufacturing costs.

When the display shelf module 358 is constructed with a shelf portion 360 and a detachable projector unit 362, the display shelf module may include one or more adapter conduits 364 (one shown in FIG. 15). For example, in embodiments where the depth D of the shelf portion 360 of the display shelf module 358 is greater than the depth d of the detachable projector unit 362 as shown in FIG. 15, a space may be present between the rear portion of the detachable projector unit 362 and the end of the shelf portion 360 when the detachable projector unit 362 is positioned such that the display panel 420 is aligned with the front of the shelf portion 360. Wires and/or other components extending between the back plane of the modular shelving system and the detachable projector unit may be directed through this space. To cover and protect the connections directed through this space, one or more adapter conduits 364 may be positioned between the rear portion of the detachable projector unit 362 and the end of the shelf portion 360. The adapter conduit 364 is generally a hollow shell which is affixed to the shelf portion 360 in a similar manner as the detachable projector unit. For example, where the detachable projector unit 362 is attached with threaded fasteners, the adapter conduit 364 may also be attached with threaded fasteners. Alternatively, the adapter conduit 364 may be slidably attached with slot-flange connection, as described hereinabove with respect to FIG. 16.

It should now be understood that the modular shelf systems described herein may include one or more display shelf modules which may be adjustably positioned on a back plane portion of the shelf support frame. The display shelf modules may include a display panel located at a front of the display shelf module and a projector positioned within the display shelf module. The projector projects an optical signal on a back surface of the display shelf module such that image data is visible on a front surface of the display shelf module. The image data may be still image data, video image data, and/or combinations thereof. Moreover, the optical signal projected from the projector onto the back of the display panel may include image data for multiple images and the display shelf module may further include optical components to deconstruct the optical signal into a plurality of discrete optical signals, each of which corresponds to a separate still or video image.

Positioning the projector within the display shelf module facilitates the modularity of the display shelf module and allows the display shelves to be vertically and/or horizontally positioned and repositioned on the back plane portion of a support frame. This is particularly useful when it is necessary to adjust the inter-shelf spacing to accommodate oversized or undersized products, remove product displays from a particular shelving system, and/or disassemble the module shelving system for reconfiguration, transport and the like. Further, the modularity of the individual display shelf modules permits individual shelving units to be removed and replaced in the event of malfunction without having to replace the entire shelving system and/or disassemble the entire shelving system.

Moreover, it should also be understood that the display panels of the modular shelving systems described herein may include touch functionality which enables the image data displayed on the display panel to include interactive components.

Further, it should also be understood that the individual display shelf modules described herein may include various other components and accessories. For example, in some embodiments, the shelf display modules may further include one or more structured light sources for determining the amount of goods present on a vertically adjacent shelf. Alternatively or additionally, the display shelf modules may include bar code readers for identifying products. In some embodiments, the display shelf modules may include a structured light source for the marker or markerless identification of objects. In still other embodiments, the display shelf modules may include eye tracking systems for determining when the display shelf modules are viewed by customers.

It should be understood that vary aspects of modular shelving systems and display shelves for modular shelving systems are disclosed herein. In a first aspect, a modular shelving system includes a shelf support frame comprising a back plane portion and a base portion. At least one display shelf module is removably coupled to the back plane portion of the shelf support frame. The at least one display shelf module includes a top panel, an optional bottom panel and side panels, the top panel, optional bottom panel and side panels defining an interior volume; a display panel affixed to a front of the at least one display shelf module; and at least one projector disposed in the interior volume of the at least one display shelf module, the at least one projector projecting an optical signal onto a back surface of the display panel such that image data is visible on a front surface of the display panel. The at least one display shelf module is removably coupled to the back plane portion of the shelf support frame such that the at least one display shelf module is vertically positionable on the back plane portion of the shelf support frame.

In a second aspect, a display shelf module of a modular shelving system includes a top panel, an optional bottom panel and side panels, the top panel, optional bottom panel and side panels defining an interior volume of the display shelf module. At least one mounting clip extends from a posterior end of the display shelf module, the at least one mounting clip for engaging with a corresponding mounting aperture of a back plane portion of a shelf support frame. A display panel is affixed to a front of the display shelf module. At least one projector is disposed in the interior volume of the display shelf module, the at least one projector projecting an optical signal onto a rear surface of the display panel such that image data is visible on a front surface of the display panel. An optical path from the at least one projector to the rear surface of the display panel is contained within the interior volume of the display shelf module.

In a third aspect, a display shelf module includes a shelf portion having a top panel and at least one mounting clip for mounting the shelf portion to a back plane portion of a modular shelving system. A detachable projector unit is removably coupled to the shelf portion and includes a display panel affixed to a front of the detachable projector unit and at least one projector disposed in an interior volume of the detachable projector unit. The at least one projector projects an optical signal onto a back surface of the display panel such that image data is visible on a front surface of the display panel.

In a fourth aspect, a display shelf module includes a top panel, an optional bottom panel and side panels, the top panel, optional bottom panel and side panels defining an interior volume of the display shelf module. At least one projector is disposed in the interior volume of the display shelf module, the at least one projector projecting an optical signal onto a rear surface of a display panel such that image data is visible on a front surface of the display panel. A plurality of optical components are positioned within the interior volume of the display shelf module, including a condenser lens, an image divider, a plurality of focusing lenses, a front mirror and at least one rear mirror. The image divider is positioned such that the optical signal from the at least one projector is incident on the image divider, the image divider dividing the optical signal from the at least one projector into a plurality of discrete optical signals and directing the plurality of discrete optical signals onto the front mirror. The condenser lens is disposed in an optical path between the at least one projector and the image divider such that, when the optical signal is projected from the at least one projector, the optical signal passes through the condenser lens before reaching the image divider, the condenser lens concentrating the optical signal projected from the at least one projector. Each of the plurality of focusing lenses is positioned in an optical path of the plurality of discrete optical signals such that each of plurality of discrete optical signals passes through a focusing lens prior to reaching the front mirror, the plurality of focusing lenses focusing the plurality of discrete optical signals onto the front mirror. The front mirror is positioned proximate the display panel and the at least one rear mirror is positioned proximate a posterior end of the display shelf module. The front mirror is oriented to redirect the plurality of discrete optical signals onto the at least one rear mirror and the at least one rear mirror is oriented to redirect the plurality of discrete optical signals onto the rear surface of the display panel. An optical path from the at least one projector to the rear surface of the display panel is contained within the interior volume.

In a fifth aspect, a modular shelving system includes a shelf support frame comprising a back plane portion and a base portion. At least one display shelf module is removably coupled to the back plane portion of the shelf support frame. The at least one display shelf module includes a top panel, an optional bottom panel and side panels, the top panel, optional bottom panel and side panels defining an interior volume. A display panel is affixed to a front of the at least one display shelf module. At least one projector is disposed in the interior volume of the display shelf module, the at least one projector projecting an optical signal onto a rear surface of the display panel such that image data is visible on a front surface of the display panel. A plurality of optical components are positioned within the interior volume of the at least one display shelf module. The plurality of optical components includes a condenser lens, an image divider, a plurality of focusing lenses, a front mirror and at least one rear mirror. The image divider is positioned such that the optical signal from the at least one projector is incident on the image divider, the image divider dividing the optical signal from the at least one projector into a plurality of discrete optical signals and directing the plurality of discrete optical signals onto the front mirror. The condenser lens is disposed in an optical path between the at least one projector and the image divider such that, when the optical signal is projected from the at least one projector, the optical signal passes through the condenser lens before reaching the image divider, the condenser lens concentrating the optical signal projected from the at least one projector. Each of the plurality of focusing lenses is positioned in an optical path of the plurality of discrete optical signals such that each of the plurality of discrete optical signals passes through a focusing lens prior to reaching the front mirror, the plurality of focusing lenses focusing the plurality of discrete optical signals onto the front mirror. The front mirror is positioned proximate the display panel and the at least one rear mirror is positioned proximate a posterior end of the at least one display shelf module, wherein the front mirror is oriented to redirect the plurality of discrete optical signals onto the rear mirror and the at least one rear mirror is oriented to redirect the plurality of discrete optical signals onto the rear surface of the display panel. An optical path from the at least one projector to the rear surface of the display panel is contained within the interior volume and the display shelf module is removably coupled to the back plane portion of the shelf support frame such that the display shelf module is vertically positionable on the back plane portion of the shelf support frame.

In a sixth aspect, the disclosure further provides the modular shelving system of either the first aspect or the fifth aspect wherein the shelf support frame comprises an array of mounting apertures formed in the back plane portion, individual mounting apertures of the array of mounting apertures being spaced at regular intervals in a vertical direction. The at least one display shelf module comprises at least one mounting clip extending from a posterior end of the at least one display shelf module, the at least one mounting clip engaging with a corresponding mounting aperture in the back plane portion such that the at least one display shelf module is removably coupled to the back plane portion of the shelf support frame.

In a seventh aspect, the disclosure provides a display shelf module as in any of the first through sixth aspects wherein the display shelf module is sealed.

In an eighth aspect, the disclosure provides a display shelf module as in any of the first through seventh aspects wherein an optical path from the at least one projector to the back surface of the display panel is substantially horizontal.

In a ninth aspect, the disclosure provides a display shelf module as in any of the first through eighth aspects wherein an optical path from the at least one projector to the back surface of the display panel is contained within the interior volume of the display shelf module.

In a tenth aspect, the disclosure provides a display shelf module as in any of the first through ninth aspects wherein an optical path from the at least one projector to the back surface of the display panel does not contain any vertical segments.

In an eleventh aspect, the disclosure provides a display shelf module as in any of the first through tenth aspects wherein the optical signal projected from the at least one projector comprises content for multiple different images.

In a twelfth aspect, the disclosure provides a display shelf module as in any of the first through eleventh aspects wherein the optical signal projected from the at least one projector comprises still image content, video image content, or combinations thereof.

In a thirteenth aspect, the disclosure provides a display shelf module as in any of the first through third aspects further comprising a plurality of optical components positioned within the interior volume of the at least one display shelf module, the plurality of optical components comprising a condenser lens, an image divider, a plurality of focusing lenses, a front mirror, and at least one rear mirror. The image divider is positioned such that the optical signal from the at least one projector is incident on the image divider, the image divider dividing the optical signal from the at least one projector into a plurality of discrete optical signals and directing the plurality of discrete optical signals onto the front mirror. The condenser lens is disposed in an optical path between the at least one projector and the image divider such that, when the optical signal is projected from the at least one projector, the optical signal passes through the condenser lens before reaching the image divider, the condenser lens concentrating the optical signal projected from the at least one projector. Each of the plurality of focusing lenses is positioned in an optical path of the plurality of discrete optical signals such that each of the plurality of discrete optical signals passes through a focusing lens prior to reaching the front mirror, the plurality of focusing lenses focusing the plurality of discrete optical signals onto the front mirror. The front mirror is positioned proximate the display panel and the at least one rear mirror is positioned proximate a posterior end of the at least one display shelf module, wherein the front mirror is oriented to redirect the plurality of discrete optical signals onto the at least one rear mirror and the at least one rear mirror is oriented to redirect the plurality of discrete optical signals onto the back surface of the display panel.

In an fourteenth aspect, the disclosure provides a display shelf module as in any of the first through thirteenth aspects wherein the plurality of optical components are mechanically isolated from a top surface of the display shelf module and a bottom surface of the display shelf module.

In a fifteenth aspect, the disclosure provides a display shelf module of the thirteenth aspect wherein the plurality of optical components are positioned on a floating frame which is spaced apart from top of the at least one display shelf module and a bottom of the at least one display shelf module.

In a sixteenth aspect, the disclosure provides a display shelf module as in the fifteenth aspect wherein the floating frame comprises a base and at least one cantilevered support arm attached to the base.

In an seventeenth aspect, the disclosure provides a display shelf module as in the sixteenth aspect, wherein the at least one projector, the condenser lens, the image divider, and the plurality of focusing lenses are mounted on the base and the front mirror and the least one rear mirror are mounted on cantilevered support arms.

In an eighteenth aspect, the disclosure provides a display shelf module as in any of the first through seventeenth aspects wherein image content for the optical signal projected by the at least one projector is stored locally in a memory of the at least one projector.

In a nineteenth aspect, the disclosure provides a display shelf module as in any of the first through eighteenth aspects further comprising an external computer system communicatively coupled to the at least one projector.

In a twentieth aspect, the disclosure provides a display shelf module as in the nineteenth aspect, wherein image content for the optical signal projected by the at least one projector is stored in the external computer system and downloaded to the at least one projector.

In a twenty-first aspect, the disclosure provides a display shelf module as in any of the first through twentieth aspects wherein the at least one projector comprises a light source optically coupled to a digital micro mirror device.

In a twenty-second aspect, the disclosure provides a display shelf module as in the twenty-first aspect wherein the light source is a white light source.

In a twenty-third aspect, the disclosure provides a display shelf module as in the twenty-first aspect wherein the light source comprises a plurality of laser sources.

In a twenty-fourth aspect, the disclosure provides a display shelf module as in any of the first through twenty-third aspects further comprising at least one photo detector communicatively coupled to a control circuit of the at least one projector and positioned such that the optical signal from the at least one projector is incident on the at least one photo detector, wherein the at least one photo detector transmits an intensity signal indicative of an intensity of the optical signal to the control circuit.

In a twenty-fifth aspect, the disclosure provides a display shelf module as in the twenty-fourth aspect wherein the at least one photo detector comprises a first photo detector, a second photo detector, and a third photo detector, wherein the first photo detector is calibrated to detect an intensity of a first wavelength range of visible light; the second photo detector is calibrated to detect an intensity of a second wavelength range of visible light; and the third photo detector is calibrated to detect a third wavelength range of visible light.

In an twenty-sixth aspect, the disclosure provides a display shelf module as in any of the twenty-fourth through twenty-fifth aspects wherein the control circuit of the at least one projector is communicatively coupled to an external computer system and relays the intensity signal to the external computer system; and the external computer system is programmed to analyze the intensity signal and provide a warning indicator when the intensity signal indicates that an optical intensity of the optical signal is below a threshold level.

In a twenty-seventh aspect, the disclosure provides a display shelf module as in any of the first through twenty-sixth aspects further comprising a bar code reader positioned within the at least one display shelf module.

In a twenty-eighth aspect, the disclosure provides a display shelf module as in the twenty-seventh aspects wherein the bar code reader is oriented to scan a bar code presented in front of the display panel.

In a twenty-ninth aspect, the disclosure provides a display shelf module as in the twenty-seventh aspect wherein the bar code reader is oriented to scan a bar code presented below the optional bottom panel of the at least one display shelf module.

In a thirtieth aspect, the disclosure provides a display shelf module as in any of the twenty-seventh through twenty-ninth aspects further comprising an external computer system communicatively coupled to the at least one projector and the bar code reader, wherein the external computer system is programmed with a machine readable and executable instruction set stored in a memory of the external computer system such that, when the instruction set is executed by a processor of the external computer system. The external computer system receives a signal from the bar code reader indicative of a scanned bar code; searches a database of product information indexed according to bar codes to identify a product associated with the scanned bar code; and projects product information related to the product onto the display panel with the at least one projector.

In a thirty-first aspect, the disclosure provides a display shelf module as in any of the twenty-seventh through twenty-ninth aspects further an external computer system communicatively coupled to the at least one projector and the bar code reader, wherein the external computer system is programmed with a machine readable and executable instruction set stored in a memory of the external computer system such that, when the instruction set is executed by a processor of the external computer system. The external computer system receives a signal from the bar code reader indicative of a scanned bar code; displays a prompt on the display panel prompting a user to input customer account information; and searches a database of product information indexed according to bar codes to identify a product associated with the scanned bar code.

In a thirty-second aspect, the disclosure provides a display shelf module as in the thirty-third aspect wherein the external computer system is further programmed to project product information related to the product onto the display panel with the at least one projector.

In a thirty-third aspect, the disclosure provides a display shelf module as in any of the thirty-first through thirty-second aspects wherein the external computer system is further programmed to store product information related to the product in an electronic account associated with the customer account information.

In a thirty-fourth aspect, the disclosure provides a display shelf module as in the thirty-third aspect wherein the external computer system is further programmed to email product information related to the product to an email address associated with the customer account information.

In a thirty-fifth aspect, the disclosure provides a display shelf module as in any of the first through thirty-fourth aspects wherein the display panel of the at least one display shelf module is a touch screen.

In a thirty-sixth aspect, the disclosure provides a display shelf module as in the thirty-fifth aspect wherein the touch screen is an optical touch screen.

In a thirty-seventh aspect, the disclosure provides a display shelf module as in the thirty-sixth aspect wherein the touch screen comprises one or more infrared back lights positioned in the interior volume of the at least one display shelf module and arranged to illuminate the back surface of the display panel; and one or more detectors positioned within the interior volume of the at least one display shelf module and oriented to capture an image of the back surface of the display panel.

In a thirty-eighth aspect, the disclosure provides a display shelf module as in any of the first through thirty-seventh aspects, further comprising an eye tracking system.

In a thirty-ninth aspect, the disclosure provides a display shelf module as in any of the first through thirty-eighth aspects further comprising a structured light device, wherein the structured light device is positioned in the interior volume of the at least one display shelf module and oriented to project an array of light downward, onto a vertically adjacent display shelf module.

In a fortieth aspect, the disclosure provides a display shelf module as in the thirty-ninth aspect further comprising an external computer system communicatively coupled to the at least one projector and the structured light device, wherein the external computer system is programmed with a machine readable and executable instruction set stored in a memory of the external computer system such that, when the instruction set is executed by a processor of the external computer system. The external computer system receives a data signal from the structured light device indicative of a captured image of the projected array of light and compares the captured image of the projected array of light to an image of the array of light when the vertically adjacent display shelf module is empty or to an image of the array of light when the vertically adjacent display shelf module is full; and determines an amount of product positioned on the vertically adjacent display shelf module based on the comparison of the captured image of the projected array of light to the image of the array of light when the vertically adjacent display shelf module is empty or the comparison with the image of the array of light when the vertically adjacent display shelf module is full of product.

In a forty-first aspect, the disclosure provides a display shelf module as in the thirty-ninth aspect further comprising an external computer system communicatively coupled to the at least one projector and the structured light device, wherein the external computer system is programmed with a machine readable and executable instruction set stored in a memory of the external computer system such that, when the instruction set is executed by a processor of the external computer system. The external computer system receives a data signal from the structured light device indicative of a captured image of the projected array of light; compares the captured image of the projected array of light to a plurality of images stored in a look up table in the memory of the external computer system, wherein each of the plurality of images stored in the look up table corresponds to an image of the array of light projected onto a display shelf module with differing amounts of product positioned on the display shelf module; and determines an amount of product positioned on the vertically adjacent display shelf module based on the comparison of the captured image of the projected array of light to the plurality of images stored in the look up table and/or if additional product should be added to the vertically adjacent display shelf module.

In a forty-second aspect, the disclosure provides a display shelf module as in any of the first through forty-first aspects wherein the at least one display shelf module further comprises a stereoscopic vision system positioned in the interior volume of the at least one display shelf module and oriented to capture images of an adjacent display shelf module positioned below the at least one display shelf module.

In a forty-third aspect, the disclosure provides a display shelf module as in any of the first through forty-second aspects wherein the at least one display shelf module is communicatively coupled to an external computer system with a wireless connection.

In a forty-fourth aspect, the disclosure provides a display shelf module as in any of the first through forty-third aspects wherein the at least one display shelf module is coupled to an external computer system with an Ethernet connection, wherein the Ethernet connection provides the at least one projector of the at least one display shelf module with a data signal and electrical power.

In a forty-fifth aspect, the disclosure provides a display shelf module as in any of the first through forty-fourth aspects wherein the at least one display shelf module is provided with power through the back plane portion of the shelf support frame.

In a forty-sixth aspect, the disclosure provides a display shelf module as in the forty-fifth aspect wherein the back plane portion comprises at least one electrical contact; and the display shelf module comprises at least one corresponding electrical contact, such that, when the at least one display shelf module is removably coupled to the back plane portion of the shelf support frame, the at least one display shelf module is electrically coupled to the back plane portion and the at least one projector of the at least one display shelf module is provided with power.

In a forty-seventh aspect, the disclosure provides a display shelf module as in any of the first through forty-sixth aspects wherein the at least one display shelf module is provided with power through a wireless connection.

In a forty-eighth aspect, the disclosure provides a display shelf module as in any of the first through forty-seventh aspects wherein the display panel of the at least one display shelf module comprises a plurality of Fresnel lines on the back surface of the display panel.

In a forty-ninth aspect, the disclosure provides a display shelf module as in the third aspect, wherein the shelf portion has a depth D, the detachable projector unit has a depth d, and D>d.

In a fiftieth aspect, the disclosure provides a display shelf module as in any of the first through forty-ninth aspects further comprising at least one adapter conduit positioned between a posterior end of the shelf portion and a rear portion of the detachable projector unit.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A modular shelving system comprising:
a shelf support frame comprising a back plane portion and a base portion;
a display shelf module removably coupled to the back plane portion of the shelf support frame and vertically positionable on the back plane portion of the shelf support frame, the display shelf module comprising:
a top panel, a bottom panel, a rear panel and side panels, the top panel, bottom panel, rear panel and side panels defining an interior volume of the display shelf module;
a display panel affixed to a front of the display shelf module opposite the rear panel, the display panel extending in a width direction of the front of the display shelf module;
a floating frame positioned within the interior volume of the display shelf module and affixed to the rear panel of the display shelf module, the floating frame comprising a base spaced apart from the top panel and the bottom panel; and
at least one projector disposed in the interior volume of the display shelf module and positioned on the base of the floating frame, the at least one projector being spaced apart from the top panel and the bottom panel of the display shelf module in which it is disposed, the at least one projector projecting an optical signal towards a front of the display shelf module and onto a back surface of the display panel of the display shelf module in which the at least one projector is disposed, image data of the optical signal being visible on a front surface of the display panel.

2. The modular shelving system of claim 1, wherein:
the shelf support frame comprises an array of mounting apertures formed in the back plane portion, individual mounting apertures of the array of mounting apertures being spaced at regular intervals in a vertical direction; and
the display shelf module comprises at least one mounting clip, the at least one mounting clip engaging with a corresponding mounting aperture in the back plane portion such that the display shelf module is removably coupled to the back plane portion of the shelf support frame.

3. The modular shelving system of claim 1, wherein the modular shelving system comprises a plurality of display shelf modules removably coupled to the back plane portion of the shelf support frame such that a vertical distance between adjacent display shelf modules is adjustable.

4. The modular shelving system of claim 1, wherein an optical path from the at least one projector to the back surface of the display panel is contained within the interior volume of the display shelf module.

5. The modular shelving system of claim 1, further comprising a plurality of optical components positioned within the interior volume of the display shelf module, the plurality of optical components comprising a condenser lens, an image divider, a plurality of focusing lenses, a front mirror, and at least one rear mirror, wherein:
the image divider is positioned such that the optical signal from the at least one projector is incident on the image divider, the image divider dividing the optical signal from the at least one projector into a plurality of discrete optical signals and directing the plurality of discrete optical signals onto the front mirror;
the condenser lens is disposed in an optical path between the at least one projector and the image divider such that, when the optical signal is projected from the at least one projector, the optical signal passes through the condenser lens before reaching the image divider, the condenser lens concentrating the optical signal projected from the at least one projector;
each of the plurality of focusing lenses is positioned in an optical path of the plurality of discrete optical signals such that each of the plurality of discrete optical signals passes through a focusing lens prior to reaching the front mirror, the plurality of focusing lenses focusing the plurality of discrete optical signals onto the front mirror; and
the front mirror is positioned proximate the display panel and the at least one rear mirror is positioned proximate a posterior end of the display shelf module, wherein the front mirror is oriented to redirect the plurality of discrete optical signals onto the at least one rear mirror and the at least one rear mirror is oriented to redirect the plurality of discrete optical signals onto the back surface of the display panel.

6. The modular shelving system of claim 1, wherein the floating frame comprises at least one cantilevered support arm attached to the base.

7. The modular shelving system of claim 1, further comprising at least one photo detector communicatively coupled to a control circuit of the at least one projector and positioned such that at least a portion of the optical signal from the at least one projector is incident on the at least one photo detector, the at least one photo detector transmitting an intensity signal indicative of an intensity of the optical signal to the control circuit.

8. The modular shelving system of claim 7, further comprising a warning indicator, wherein the warning indicator is activated when the intensity signal indicates that an optical intensity of the optical signal is below a threshold level.

9. The modular shelving system of claim 1, further comprising:
a bar code reader positioned within the display shelf module; and
an external computer system communicatively coupled to the at least one projector and the bar code reader, wherein the external computer system is programmed with a machine readable and executable instruction set stored in a memory of the external computer system such that, when the instruction set is executed by a processor of the external computer system, the external computer system:
receives a signal from the bar code reader indicative of a scanned bar code;
searches a database of product information indexed according to bar codes to identify a product associated with the scanned bar code; and projects product information related to the product onto the display panel with the at least one projector.

10. The modular shelving system of claim 9, wherein the external computer system is further programmed to:
project a prompt on the display panel with the at least one projector prompting a user to input customer account information; and
store product information related to the product in an electronic account associated with the customer account information received from the user.

11. The modular shelving system of claim 10, wherein the external computer system is further programmed to email product information related to the product to an email address associated with the customer account information.

12. The modular shelving system of claim 1, wherein the display panel of the display shelf module is a touch screen.

13. The modular shelving system of claim 12, wherein the touch screen comprises:
one or more infrared back lights positioned in the interior volume of the display shelf module and arranged to illuminate the back surface of the display panel; and
one or more detectors positioned within the interior volume of the display shelf module and oriented to capture an image of the back surface of the display panel.

14. The modular shelving system of claim 1, further comprising:
a structured light device positioned in the interior volume of the display shelf module and oriented to project an array of light downward, onto a vertically adjacent display shelf module; and
an external computer system communicatively coupled to the at least one projector and the structured light device, wherein the external computer system is programmed with a machine readable and executable instruction set stored in a memory of the external computer system such that, when the instruction set is executed by a processor of the external computer system, the external computer system:
receives a data signal from the structured light device indicative of a captured image of the projected array of light;
compares the captured image of the projected array of light to an image of the array of light when the vertically adjacent display shelf module has a predetermined amount of product on the vertically adjacent display shelf module; and
determines an amount of product positioned on the vertically adjacent display shelf module based on the comparison of the captured image of the projected array of light to the image of the array of light when the vertically adjacent display shelf module has a predetermined amount of product on the vertically adjacent display shelf module.

15. The modular shelving system of claim 1, wherein the display shelf module further comprises a stereoscopic vision system positioned in the interior volume of the display shelf module and oriented to capture images of an adjacent display shelf module positioned below the display shelf module.

16. The modular shelving system of claim 1, wherein the display shelf module is provided with power through the back plane portion of the shelf support frame.

17. The modular shelving system of claim 16, wherein:
the back plane portion of the shelf support frame comprises a mounting aperture, the mounting aperture comprising an electrical contact coupled to a power source; and
the display shelf module comprises at least one corresponding electrical contact coupled to the projector positioned in the interior volume of display shelf module, such that, when the display shelf module is removably coupled to the back plane portion of the shelf support frame, the at least one corresponding electrical contact is electrically coupled to the electrical contact of the mounting aperture of the back plane portion and the at least one projector of the display shelf module is provided with power.

18. A display shelf module comprising:
a top panel, a bottom panel, a rear panel, and side panels, the top panel, bottom panel, rear panel and side panels defining an interior volume of the display shelf module;
at least one mounting clip, the at least one mounting clip for engaging with a corresponding mounting aperture of a back plane portion of a shelf support frame;
a display panel affixed to a front of the display shelf module opposite the rear panel, the display panel extending in a width direction of the front of the display shelf module;
a floating frame positioned within the interior volume of the display shelf module and affixed to the rear panel of the display shelf module, the floating frame comprising a base spaced apart from the top panel and the bottom panel; and
at least one projector disposed in the interior volume of the display shelf module and positioned on the base of the floating frame, the at least one projector being spaced apart from the top panel and the bottom panel of the display shelf module in which it is disposed, the at least one projector projecting an optical signal towards a front of the display shelf module and onto a rear surface of the display panel of the display shelf module in which the at least one projector is disposed, image data of the optical signal being visible on a front surface of the display panel, an optical path from the at least one projector to the rear surface of the display panel being contained within the interior volume of the display shelf module.

19. The display shelf module of claim 18, further comprising a plurality of optical components positioned within the interior volume of the display shelf module, the plurality of optical components comprising a condenser lens, an image divider, a plurality of focusing lenses, a front mirror and at least one rear mirror, wherein:
the image divider is positioned such that the optical signal from the at least one projector is incident on the image divider, the image divider dividing the optical signal from the at least one projector into a plurality of discrete optical signals and directs the plurality of discrete optical signals onto the front mirror;
the condenser lens is disposed in an optical path between the at least one projector and the image divider such that, when the optical signal is projected from the at least one projector, the optical signal passes through the condenser lens before reaching the image divider, the condenser lens concentrating the optical signal projected from the at least one projector;
each of the plurality of focusing lenses is positioned in an optical path of the plurality of discrete optical signals such that each of plurality of discrete optical signals passes through a focusing lens prior to reaching the front mirror, the plurality of focusing lenses focusing the plurality of discrete optical signals onto the front mirror; and the front mirror is positioned proximate the display panel and the at least one rear mirror is positioned proximate the posterior end of the display shelf module, wherein the front mirror is oriented to redirect the plurality of discrete optical signals onto the at least one rear mirror and the at least one rear mirror is oriented to redirect the plurality of discrete optical signals onto the rear surface of the display panel.

20. The display shelf module of claim 19, wherein the display panel is a touch screen and the display panel further comprises:

an optical sensor positioned in the interior volume of the display shelf module; and an array of infrared LED elements positioned in the interior volume of the display shelf module and oriented to illuminate a rear surface of the display panel with infrared light, wherein the optical sensor captures an image of the rear surface of the display panel based on infrared light reflected from the rear surface of the display panel.

21. A display shelf module comprising:

a shelf portion comprising a top panel and at least one mounting clip for mounting the shelf portion to a back plane portion of a modular shelving system;

a detachable projector unit removably coupled to the shelf portion, the detachable projector unit comprising:

a display panel affixed to a front of the detachable projector unit;

a floating frame positioned within the interior volume of the detachable projector unit and affixed to a rear panel of the detachable projector unit, the floating frame comprising a base spaced apart from a top panel and a bottom panel of the detachable projector unit; and at least one projector disposed in an interior volume of the detachable projector unit and positioned on the base of the floating frame, the at least one projector being spaced apart from a top panel and a bottom panel of the detachable projector unit in which it is disposed, the at least one projector projecting an optical signal towards a front of the display shelf module and onto a back surface of the display panel, image data being visible on a front surface of the display panel of the detachable projector unit in which the projector is disposed.

22. The display shelf module of claim 21, wherein the shelf portion has a depth D, the detachable projector unit has a depth d, and D>d.

23. The display shelf module of claim 21, further comprising at least one adapter conduit positioned between a posterior end of the shelf portion and a rear portion of the detachable projector unit.

24. The modular shelving system of claim 1, further comprising a floating stanchion position in the interior volume of the display shelf module, the floating stanchion extending between the top panel and the bottom panel, the floating stanchion transmitting deflections of the top panel or the bottom panel to an opposing panel to prevent misalignment of the projector.

* * * * *